United States Patent [19]
Obayashi et al.

[11] Patent Number: 5,710,986
[45] Date of Patent: *Jan. 20, 1998

[54] DUAL MODE RADIO COMMUNICATION APPARATUS HAVING FUNCTION OF SELECTIVELY DESIGNATING ANALOG OR DIGITAL MODE

[75] Inventors: Arata Obayashi; Takumi Haga; Naoyuki Wakabayashi; Takashi Sakagawa, all of Tokyo, Japan

[73] Assignee: Kabushiki Kaisha Toshiba, Kanagawa-ken, Japan

[*] Notice: The term of this patent shall not extend beyond the expiration date of Pat. No. 5,564,077.

[21] Appl. No.: 617,942

[22] Filed: Mar. 15, 1996

Related U.S. Application Data

[63] Continuation of Ser. No. 13,644, Feb. 4, 1993.

[30] Foreign Application Priority Data

Feb. 5, 1992 [JP] Japan ........................ 4-20075
Feb. 5, 1992 [JP] Japan ........................ 4-20076
Feb. 5, 1992 [JP] Japan ........................ 4-20077
Feb. 5, 1992 [JP] Japan ........................ 4-20078

[51] Int. Cl.$^6$ ........................ H04Q 7/22; H04Q 7/32
[52] U.S. Cl. ........................ 455/89; 455/33.2; 455/54.2; 375/216; 379/59
[58] Field of Search ........................ 455/33.1, 33.2, 455/54.1, 54.2, 73, 78, 89; 379/58–60, 63; 375/216

[56] References Cited

U.S. PATENT DOCUMENTS

| 4,977,609 | 12/1990 | McClure | 455/89 |
| 5,228,074 | 7/1993 | Mizikovsky | 379/59 |
| 5,257,401 | 10/1993 | Dahlin et al. | 455/33.2 |
| 5,335,355 | 8/1994 | Tanaka et al. | 455/33.1 |
| 5,564,077 | 10/1996 | Obayashi et al. | 455/89 |

Primary Examiner—Chi H. Pham
Attorney, Agent, or Firm—Banner & Witcoff, Ltd.

[57] ABSTRACT

A radio communication apparatus of this invention includes a mode designation switch for selectively designating and inputting a desired mode from an analog mode and a digital mode, and a mode storage circuit for storing the desired mode designated and input by the mode designation switch and has a mode setting control function, a mode comparison function, and a mode change control function. In order to establish a radio link, control is performed to set a mode for transmitting a communication signal in accordance with the desired mode stored in the mode storage circuit. After the start of transmission of the communication signal, the mode comparison function compares the mode set by the mode setting control function with the desired mode stored in the mode storage circuit. If these modes are determined not to coincide with each other by the mode comparison function, control is performed to change the mode set by the mode setting control function to the desired mode stored in the mode storage circuit in accordance with the mode change control function.

8 Claims, 19 Drawing Sheets

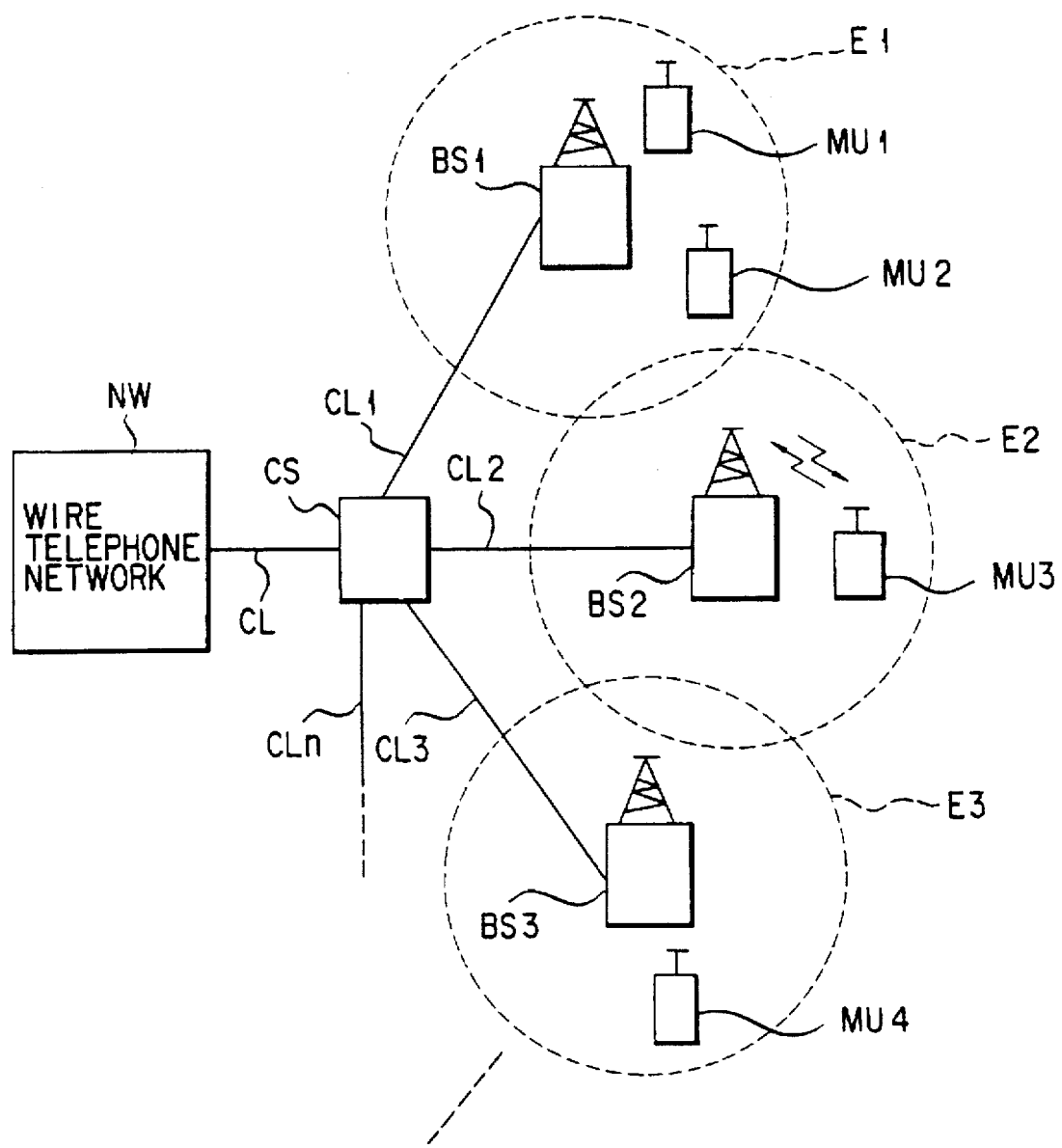
F I G. 1

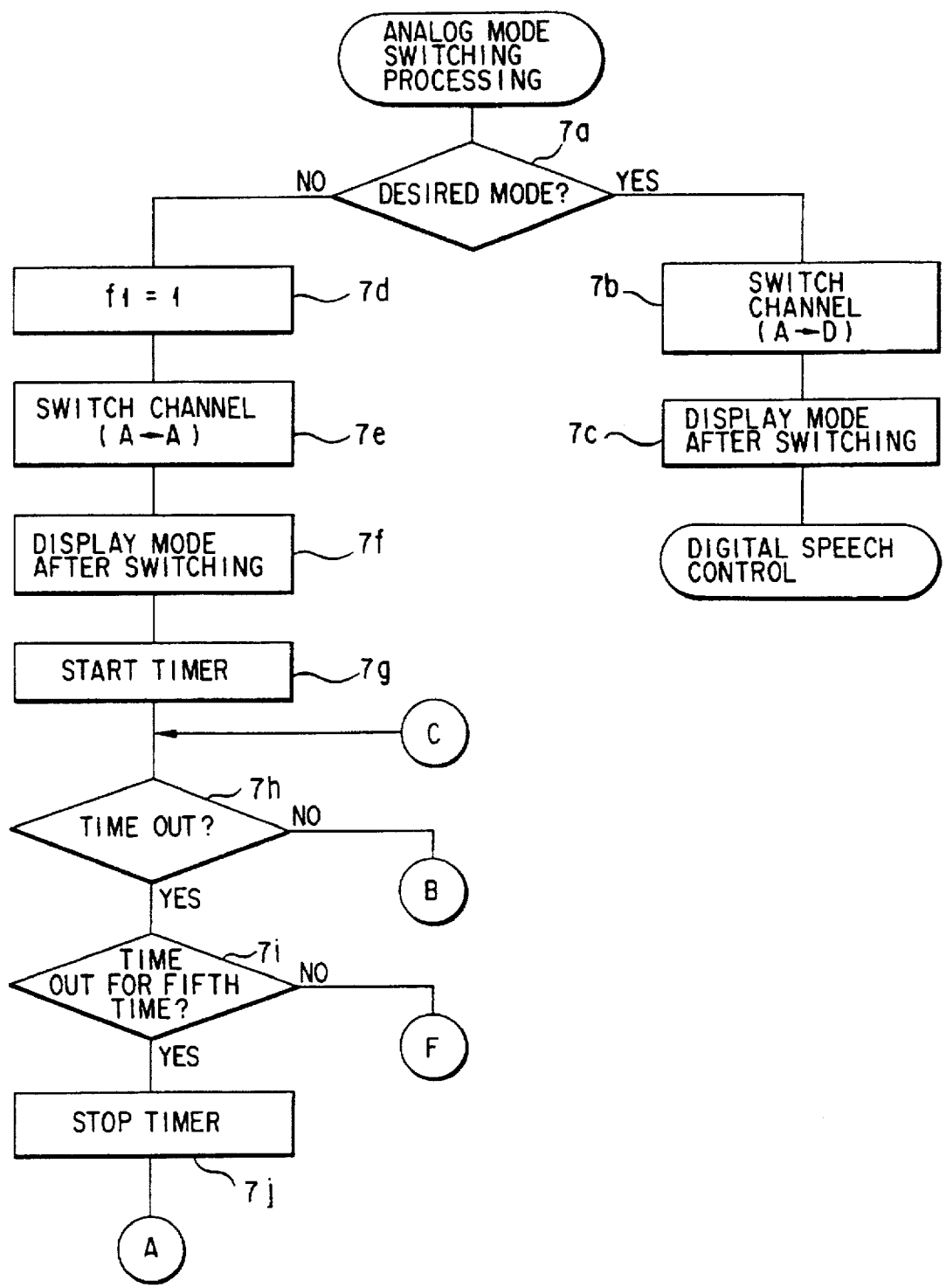
F I G. 7

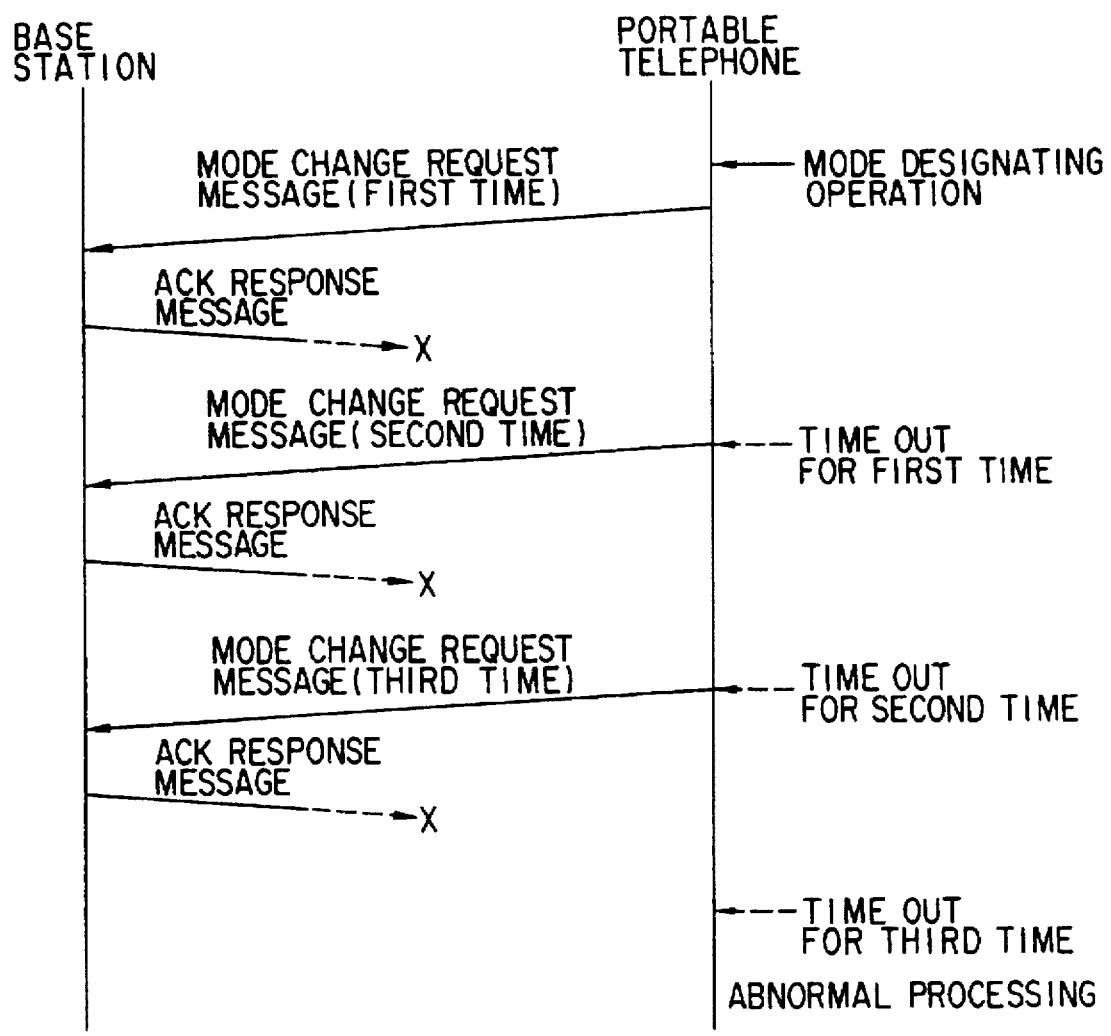
F I G. 10

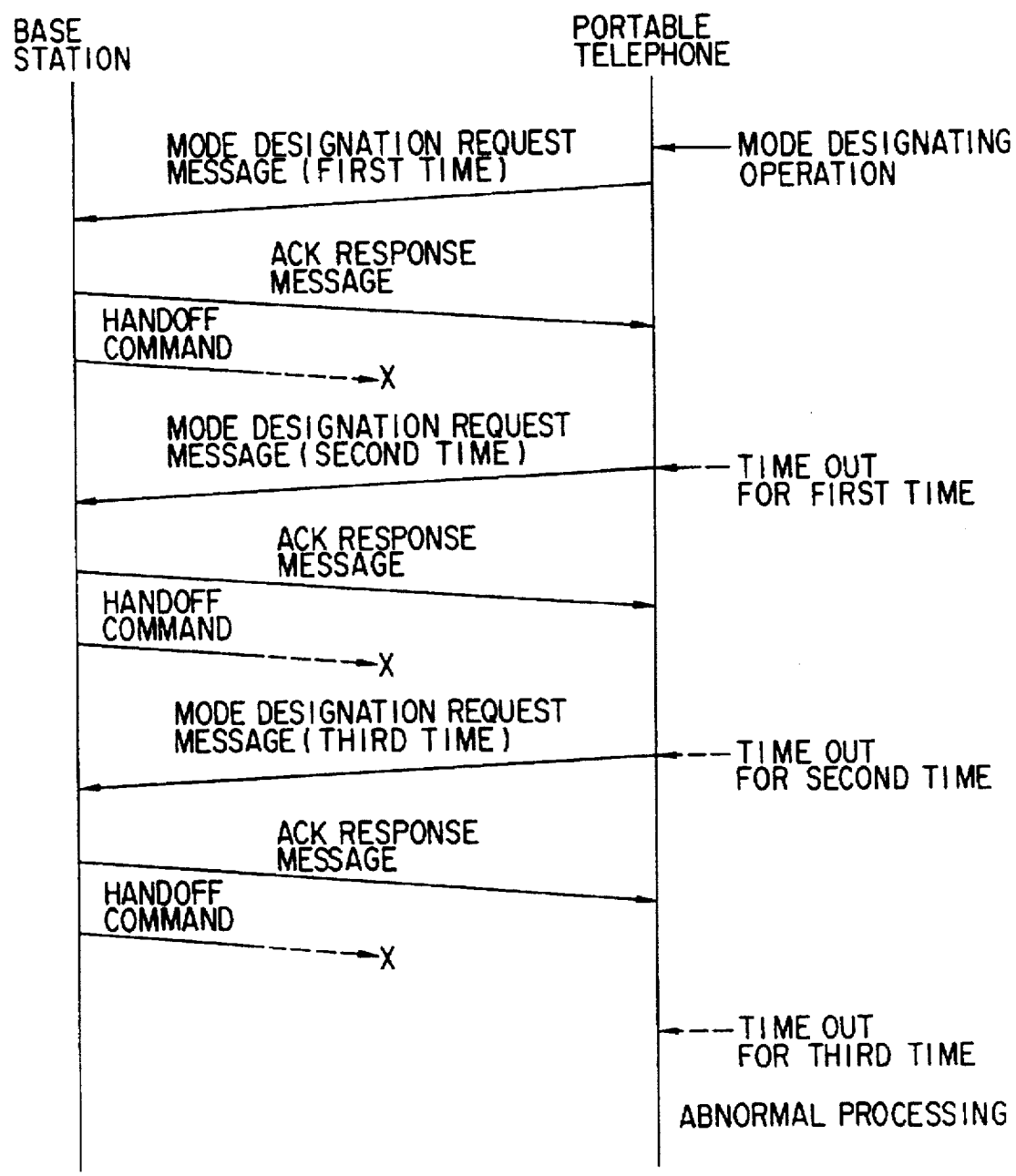
F I G. 11

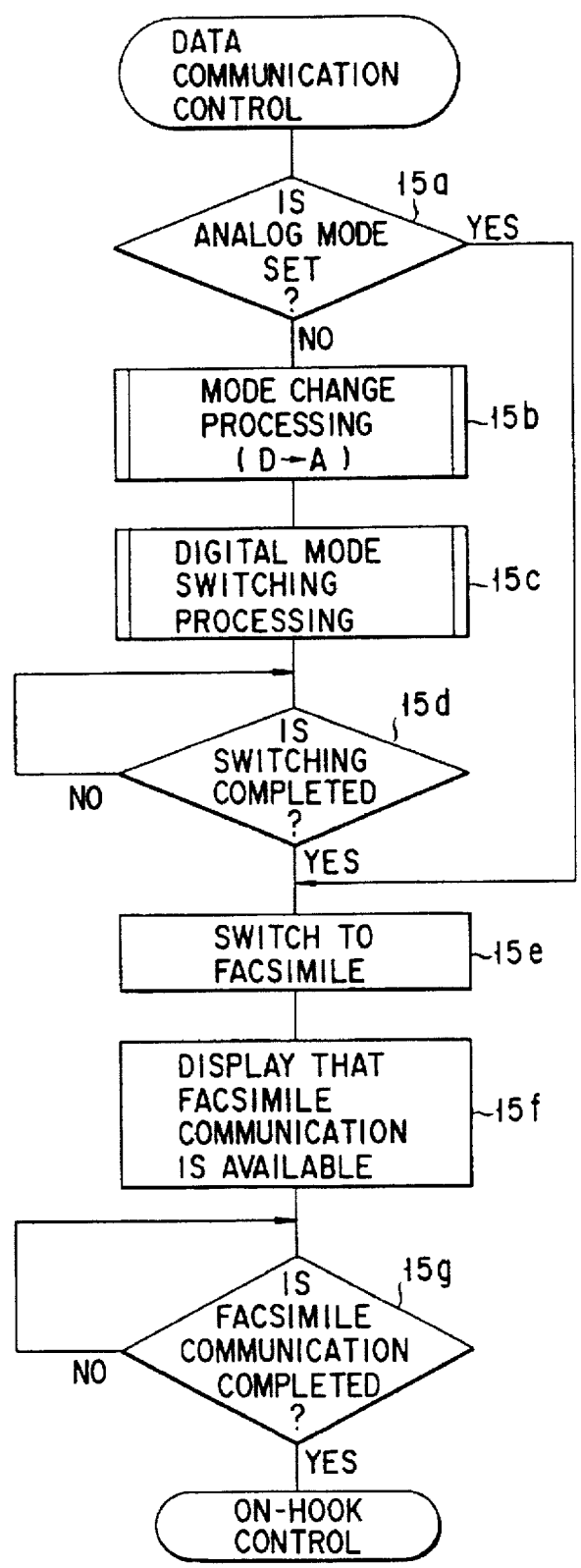
F I G. 15

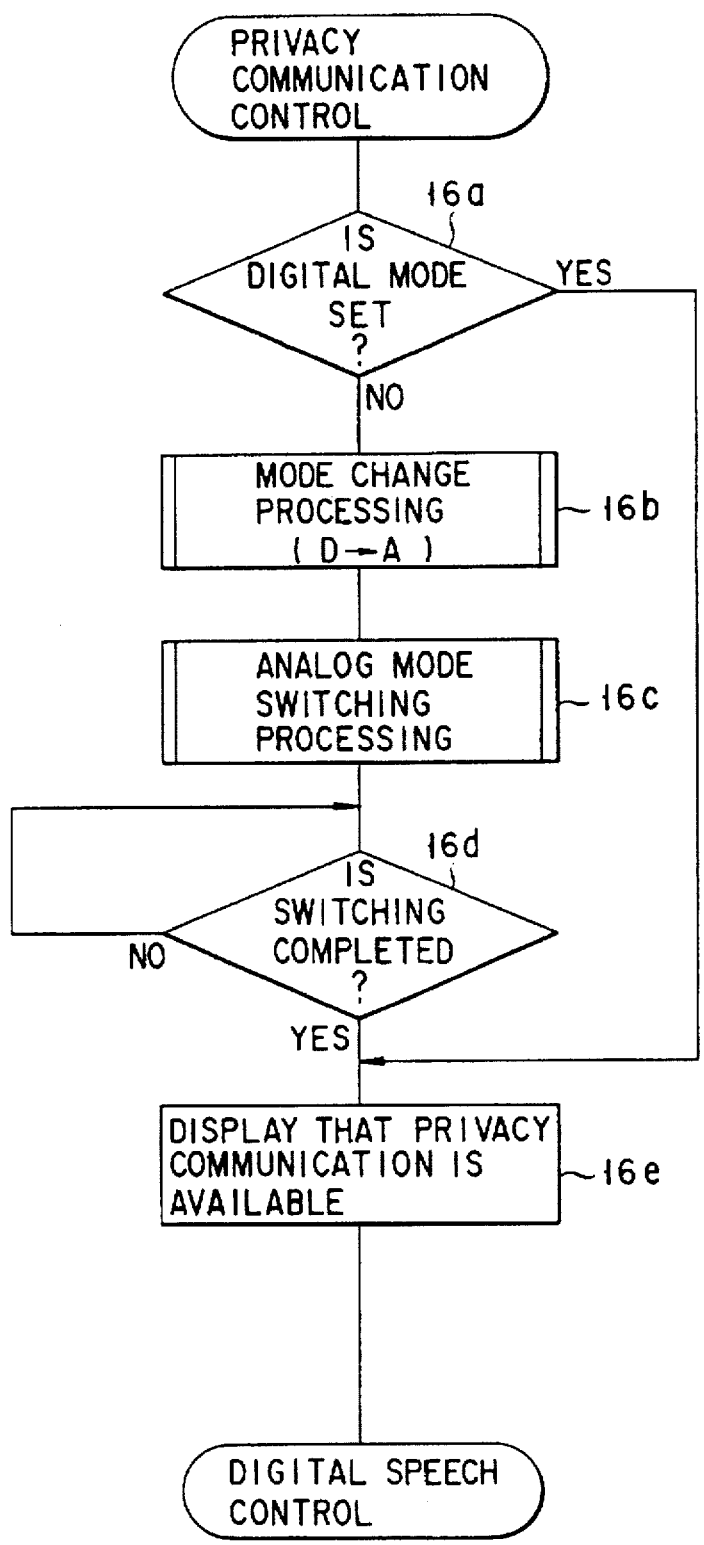
F I G. 16

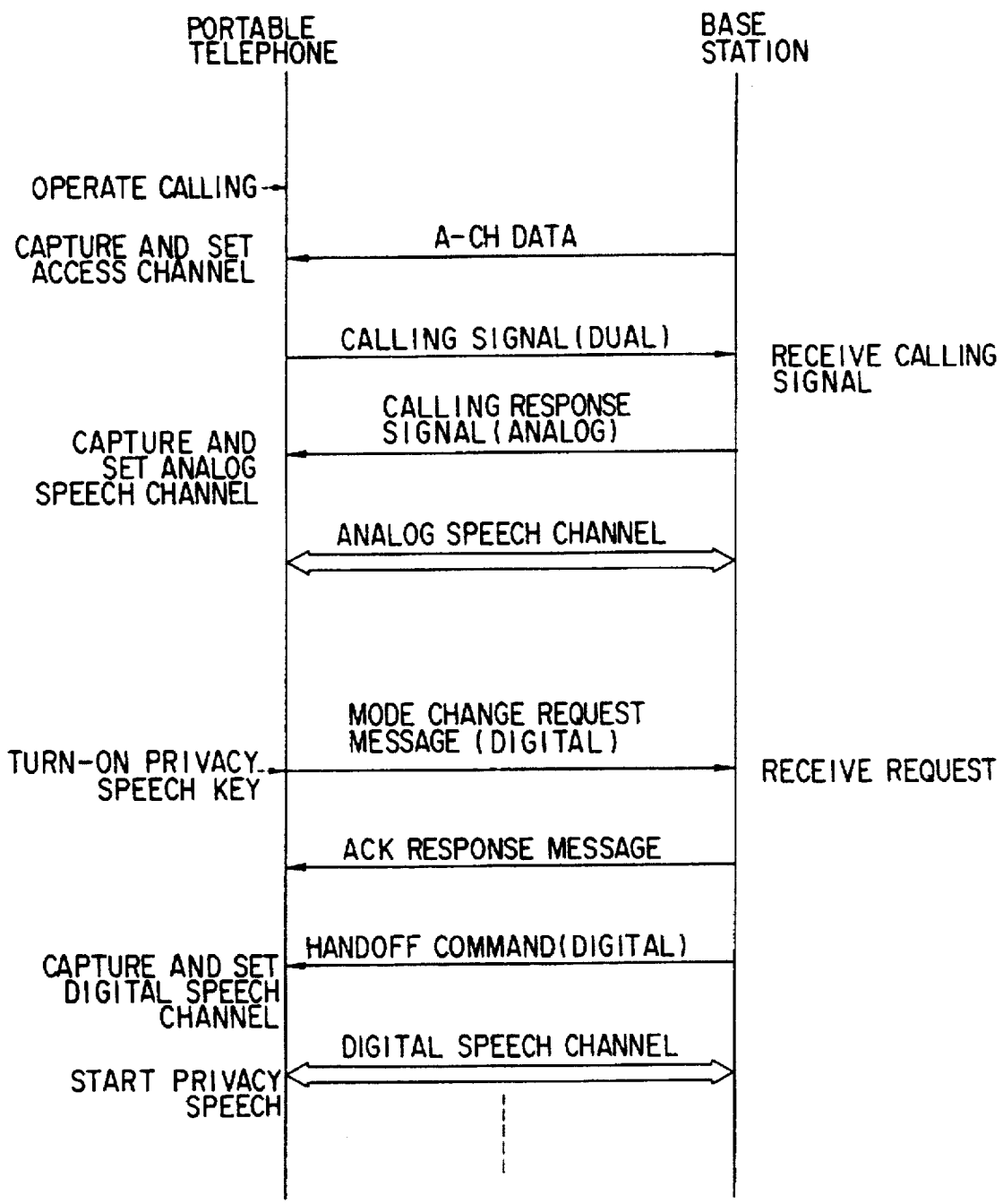
F I G. 18

DUAL MODE RADIO COMMUNICATION APPARATUS HAVING FUNCTION OF SELECTIVELY DESIGNATING ANALOG OR DIGITAL MODE

This application is a continuation of application Ser. No. 08/013,644, filed Feb. 4, 1993.

BACKGROUND OF THE INVENTION

1. Field of the Invention

The present invention relates to radio communication apparatuses such as mobile telephones, portable telephones, and cordless telephones and, more particularly, to a dual mode radio communication apparatus used in a mobile radio communication system for transmitting a radio communication signal between a base station and a mobile unit by selectively using an analog or digital mode.

2. Description of the Related Art

In recent years, a system using a dual mode scheme has been proposed in place of a mobile radio communication system for transmitting a radio communication signal in accordance with a conventional analog scheme. The dual mode is a scheme for selectively using an analog or digital mode.

In the analog mode, a transmitter transmits a carrier wave modulated with an analog speech signal and data in accordance with, e.g., FM modulation. A receiver receives the modulated wave from the transmitter and FM-demodulates it to reproduce the analog speech signal and data. On the other hand, in the digital mode, a transmitter encodes a speech signal and data, and a carrier wave is digitally modulated with the encoded signals in accordance with, e.g., a π/4 shifted DQPSK (π/4 shifted, differentially encoded quadrature phase shift keying) scheme. The digitally modulated wave is transmitted from the transmitter. A receiver receives the modulated wave sent from the transmitter and demodulates it, thereby reproducing the speech signal and data.

In recent years, a proposal has been made to cause a mobile unit to selectively use the analog or digital mode in the system described above. According to this scheme, a function switch for designating a mode is arranged in the mobile unit. When a desired mode is designated with this switch, this desired mode is informed to a base station at the time of radio speech channel connection for starting speech communication. The base station searches a non-busy radio speech channel in accordance with the informed desired mode. If any non-busy radio speech channel is found, this radio speech channel is informed to the mobile unit. The base station and the mobile unit are connected via this radio speech channel. Even during speech communication, the operation of the function switch is monitored in the mobile unit when this function switch is operated, a mode change request is informed to the base station. The base station searches a non-busy radio speech channel in accordance with this request. If a radio speech channel corresponding to the mode desired by the mobile unit is found during this search operation, this radio speech channel is informed from the base station to the mobile unit. As a result, the current radio speech channel is switched to the new radio speech channel. In this system, it is possible to directly transit the state from the state in which normal speech communication is performed using an analog speech channel to the state in which privacy speech communication using a digital speech channel is performed.

In the system of this type, however, various problems are left unsolved in operations for designating a mode in the mobile unit.

SUMMARY OF THE INVENTION

It is the first object of the present invention to automatically change the current mode to a desired mode without causing a user to perform a mode change operation even if the user does not set the desired mode at the start of communication, thereby improving operability.

It is the second object of the present invention to automatically change the current mode to a desired mode without causing a user to perform a mode change operation again even if the desired mode cannot be set upon a mode change during communication, thereby improving operability.

It is the third object of the present invention not to perform wasteful mode change control when the same mode as that set during communication is designated.

It is the fourth object of the present invention to cause a user to clearly confirm at least one of the mode currently used in communication and the desired mode input by a mode designation operation, thereby preventing communication in an inappropriate mode and an erroneous mode change operation.

It is the fifth object of the present invention to allow setup of a mode suitable for specific functional communication without any mode change operation when the specific functional communication is to be performed, thereby preventing communication in an inappropriate mode and improving operability.

It is the sixth object of the present invention to properly execute mode change processing when a handoff command is not sent back from a base station upon transmission of a mode change request.

In order to achieve the first object, a radio communication apparatus according to the present invention comprises a mode designation switch for selectively designating and inputting a desired mode from an analog mode and a digital mode, and a mode storage circuit for storing the desired mode designated and input by the mode designation switch, and has a mode setting control function, a mode comparison function, and a mode change control function. In order to establish a radio link, control is performed to set a mode for transmitting a communication signal in accordance with the desired mode stored in the mode storage circuit. After the start of transmission of the communication signal, the mode comparison function compares the mode set by the mode setting control circuit with the desired mode stored in the mode storage circuit. If these modes are determined not to coincide with each other by the mode comparison function, control is performed to change the mode set by the mode setting control function to the desired mode stored in the mode storage circuit in accordance with the mode change control function.

As a result, according to the present invention, in order to establish the radio link, for example, when a radio speech channel of a non-desired mode is set because of the absence of a non-busy radio speech channel of the desired mode, control for automatically changing the set mode to the desired mode is performed in accordance with the mode change control function even if the user does operate the mode designation switch. For this reason, the user need not perform a mode change operation with the mode designation switch, thereby improving operability.

The control for changing the mode to the desired mode by the mode change control function is preferably performed with a lapse of a predetermined period of time after the non-desired mode is set by the mode setting control function. With this arrangement, a probability for capturing a non-busy channel of the desired mode is increased, and the change in mode to the desired mode can be performed by a smaller number of times of control.

The control for changing the mode to the desired mode by the mode change control function is preferably repeatedly performed until the desired mode is set. With this arrangement, control is repeated until the mode currently used in communication is changed to the desired mode. For this reason, even if the number of non-busy radio speech channels corresponding to the desired mode is small, the mode can be relatively properly changed to the desired mode.

In this case, when a maximum value of the number of times of repetition of mode change control is set, wasteful, endless control can be prevented when a base station, for example, does not have a radio speech channel corresponding to the desired mode.

In order to achieve the second object, a radio communication apparatus according to the present invention comprises a mode designation switch for selectively designating and inputting a desired mode from an analog mode and a digital mode, and a mode storage circuit for storing the desired mode designated and input by the mode designation switch, and has a mode comparison function, a first mode change control function, and a second mode change control function. When an operation for changing the mode to the desired mode is performed with the mode designation switch during transmission of the communication signal, control for changing the mode currently used in communication to the desired mode is executed in accordance with the first mode change control function. During execution of this change control, the mode comparison function compares the mode set by this mode control with the desired mode stored in the mode storage circuit. If the mode comparison function determines that these modes are different from each other, control is executed to change the mode currently used in communication to the desired mode stored in the mode storage circuit.

As a result, according to the present invention, even if the mode currently used in communication is not changed to the desired mode even if the user performs a mode change operation during communication, control for automatically changing the set mode to the desired mode is performed in accordance with the second mode change control function. For this reason, the user need not perform the mode change operation with the mode designation switch again, thereby improving operability.

In order to achieve the third object, a radio communication apparatus according to the present invention comprises a mode designation switch for selectively designating and inputting a desired mode from an analog mode and a digital mode, and has a mode comparison function and a mode change control inhibition function. In the mode comparison function, when the desired mode is designated and input with the mode designation switch during transmission of the communication signal, the desired mode is compared with the mode currently used in transmission of the communication signal. When these modes are determined to coincide with each other in accordance with the mode comparison function, control for changing the mode currently used in communication to the desired mode is inhibited by the mode change control inhibition function.

According to the present invention, therefore, even if the user erroneously performs a mode change operation for changing the mode to the mode currently used in communication, unnecessary mode change control for changing a given mode to the given mode will not be executed. For this reason, a mode change request signal is not transmitted to a mating communication apparatus such as a base station. Therefore, wasteful mode change control can be inhibited in both the mobile unit and the base station.

The mode comparison processing and the mode change control inhibition processing are preferably performed prior to the start of main control associated with the mode change. With this arrangement, wasteful processing associated with mode change control is rarely performed, the wasteful power consumption can be reduced, and the service life of the battery can be prolonged.

In addition to the mode comparison function and the mode change control inhibition function, a quality determination function may be added to determine the quality of a radio channel currently used in transmission of the communication signal. The mode change control and the mode change control inhibition processing may be performed on the basis of the comparison result of the mode comparison function and the determination result of the quality determination function. More specifically, when the mode comparison function detects that the modes do not coincide with each other and the quality determination function determines that the quality of the radio speech channel does not satisfy a predetermined quality, control for changing the mode currently used in transmission of the communication signal to the desired mode is executed. To the contrary, when the mode comparison function detects that the modes coincide with each other and the quality determination function determines that the quality of the radio speech channel satisfies the predetermined quality, control for changing the mode currently used in transmission of the communication signal to the desired mode is inhibited.

With this arrangement, even if the mode currently used in transmission of the communication signal coincides with the desired mode, the mode change control is not inhibited under the condition that the quality of the radio speech channel used is degraded. Therefore, the radio channel can be switched from the degraded channel to a high-quality channel of the same mode.

In order to achieve the fourth object, a radio communication apparatus according to the present invention has a mode display function in addition to the mode designation switch and the mode setting/changing control function. By this mode display function, at least one of the desired mode designated and input by the mode designation switch and the mode set or changed by the mode setting/changing control function can be displayed.

As a result, according to the present invention, at the start of communication and during communication, the user can properly know at least one of the desired mode designated by the user and the mode currently used in communication. For this reason, after the user checks the mode currently used in communication and the desired mode designated with the mode designation switch, he performs a mode change operation. A non-desired mode will not be erroneously designated, and the same mode as that currently used in communication will not be designated again. Even if a mode different from the desired mode is set, the user can properly know this. For this reason, for example, privacy speech communication will not be set in a state wherein the analog mode is set, and facsimile communication which is preferably performed in analog transmission will not be set in a state wherein the digital mode is set.

In order to achieve the fifth object, in a radio communication apparatus according to the present invention, when a request for performing specific functional communication such as privacy communication and analog facsimile communication by operating function switches is input during transmission of the communication signal, control is executed to change the mode currently used to a mode predetermined in correspondence with the functional communication designated by an execution request in accordance with the input of this execution request. After execution of the mode change control, control is executed to start the functional communication designated by the execution request.

As a result, according to the present invention, for example, when the communication mode is to be changed from normal communication to the functional communication, the mode currently used in communication is automatically changed to the mode suitable for the functional communication. For this reason, the operation for changing the current mode to the mode suitable for the functional communication can be omitted, thereby improving operability. The number of operational errors can be reduced.

In the mode change control described above, when the execution request for the specific functional communication is input, it is determined whether the currently set mode coincides with the mode predetermined in correspondence with the specific functional communication. If a coincidence is not detected, the current mode is changed to the mode predetermined in correspondence with the specific functional communication. However, if a coincidence is detected, control for changing the current mode to the mode predetermined in correspondence with the specific functional communication can be omitted, and control for performing the specific functional communication is preferably executed.

With this arrangement, mode change control is performed only when a mode change is truly required. For this reason, when the mode required for the specific functional communication has already been set, wasteful control is not performed. Therefore, a time loss of control processing in both the mobile unit and the base station can be prevented, and highly efficient control processing can be performed.

In order to achieve the sixth object, a radio communication apparatus according to the present invention comprises a transmitter for transmitting, to a base station, a mode change request signal for changing a mode for transmitting a communication signal to a desired mode at the time of a change in mode, a receiver for receiving a response signal representing acknowledgement of a change in request and a handoff signal, the response signal and the handoff signal being sequentially sent back from the base station in response to the mode change request signal, a monitor circuit, and a retransmitter. In the receiver, when the handoff signal is not received upon reception of the response signal, the monitor circuit monitors reentry of the desired mode by the mode designation switch. When the reentry of the desired mode is detected by the monitor circuit, the mode change request signal is retransmitted to the base station by the retransmitter.

As a result, according to the present invention, even if the handoff signal is not sent back from the base station due to some reason, the reentry of the desired mode by the user can be accepted, thereby retransmitting the mode change request signal. For this reason, mode change control will not be interrupted while receiving the handoff signal.

In the retransmitter, when the handoff signal is not received within a predetermined period of time upon reception of the response signal, control may be executed to retransmit the mode change request signal to the base station. With this arrangement, mode change control will not be interrupted while receiving the handoff signal. In addition, the mode change request signal can be automatically transmitted to the base station even if the user does not perform a reentry operation of the desired mode. Therefore, operations of the user can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram showing the configuration of a dual mode cellular radio communication system according to the first embodiment of the present invention;

FIG. 7 is a flow chart showing a sequence of analog mode switching control in the control circuit of the portable telephone shown in FIG. 2;

FIG. 10 is a view showing a first case of a transmission sequence of a mode change request message of the portable telephone shown in FIG. 2;

FIG. 11 is a view showing a second case of a transmission sequence of the mode change request message of the portable telephone shown in FIG. 2;

FIG. 15 is a flow chart illustrating the sequence of the data communication control performed by the control circuit incorporated in the portable telephone of FIG. 13;

FIG. 16 is a flow chart explaining the sequence of the privacy communication control achieved by the control circuit incorporated in the portable telephone of FIG. 13;

FIG. 18 is a flow chart explaining the sequence of the privacy communication performed by the portable telephone of FIG. 13.

DETAILED DESCRIPTION OF THE PREFERRED EMBODIMENTS (First Embodiment)

FIG. 1 is a view showing a schematic arrangement of a dual mode cellular radio communication system according to the first embodiment of the present invention. This system includes a control station CS, a plurality of base stations BS1 to BS3, and a plurality of mobile units MU1 to MU4. The control station CS is connected to a wire telephone network NW via a landline CL. The base stations BS1 to BS3 are connected to the control station CS via landlines CL1 to CL3, respectively. The base stations BS1 to BS3 form radio zones E1 to E3, respectively. The mobile units MU1 to MU4 are connected to the base stations BS1 to BS3 via radio channels in the radio zones of the base stations BS1 to BS3. The radio channels are roughly classified as control channels and speech channels. The speech channels consist of a plurality of analog speech channels for an analog mode and a plurality of digital speech channels for a digital mode.

Figure 2:
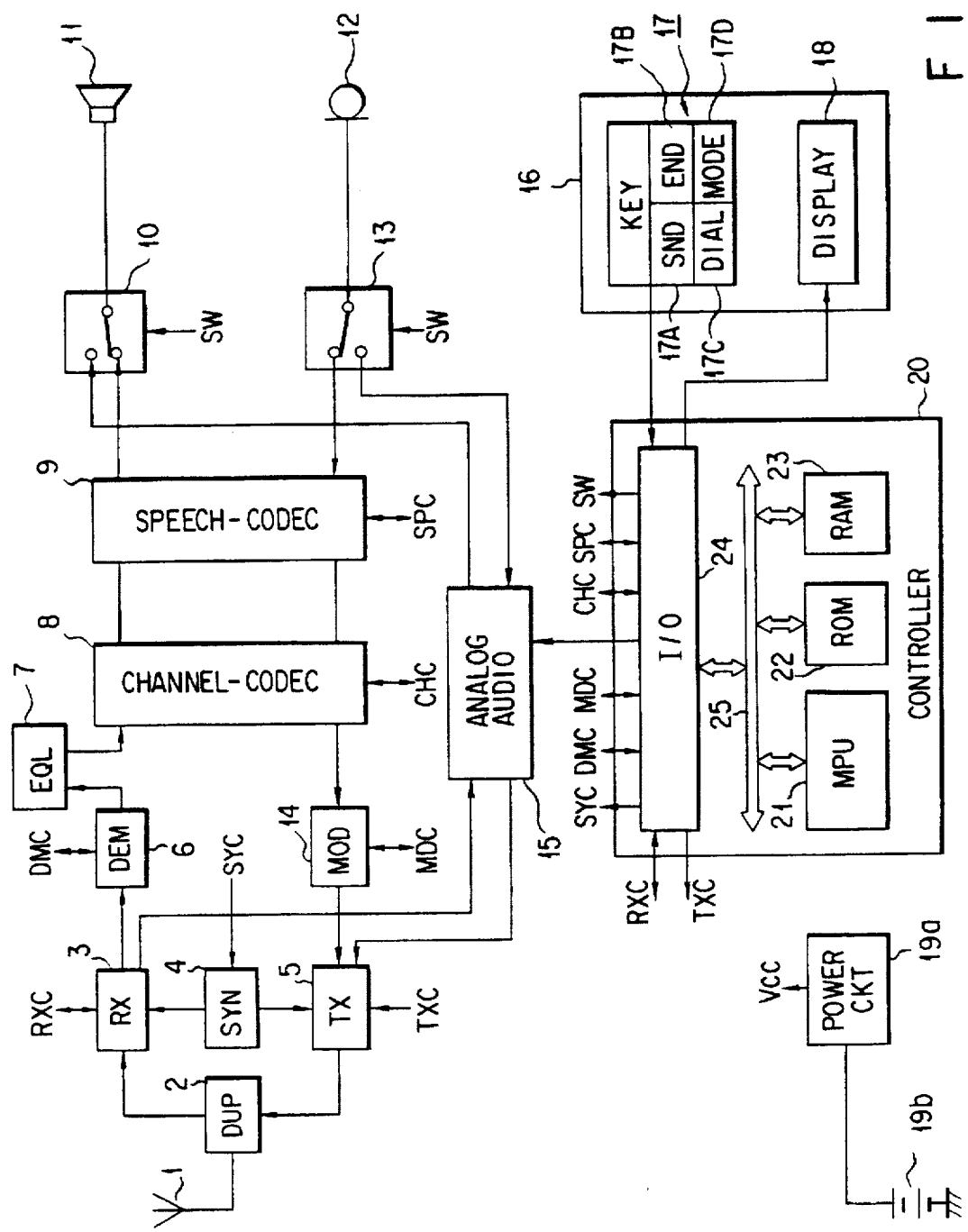
FIG. 2 is a block diagram showing a circuit arrangement of a portable telephone according to the first embodiment of the present invention.

The mobile units MU1 to MU4 include a portable telephone unit and a mobile telephone unit. FIG. 2 is a circuit diagram showing an arrangement of the portable telephone unit.

In FIG. 2, when a digital mode is set, a radio frequency signal sent from the base stations BS1 to BS3 via a digital speech channel is received by an antenna 1 and input to a receiver 3 via a duplexer 2. In the receiver 3, the radio frequency signal is mixed with a reception local oscillation signal output from a frequency synthesizer 4 to be frequency-converted into an intermediate frequency signal. Note that the frequency of the reception local oscillation signal generated by the frequency synthesizer 4 is designated by a control signal SYC output from a controller 20. The reception intermediate frequency signal is converted into a digital signal by an A/D converter (not shown) and input to a digital demodulator 6. In the digital demodulator 6, the reception intermediate signal is digitally demodulated to be converted into a digital baseband signal. As the digital baseband signal output from the digital demodulator 6, there are a digital speech signal and a digital control signal. Of these signals, a digital control signal DMC is received by the controller 20 to be discriminated. On the other hand, the digital speech signal is input to an error correction encoder/decoder (channel-encoder-decoder, to be referred to as a channel-codec hereinafter) 8 after equalization or the like of a demodulated waveform is performed by an equalizer 7. In the channel-codec 8, error correction decoding of the digital speech signal supplied from the equalizer 7 is performed, and the error-correction decoded digital speech signal is input to a speech-encoder/decoder (to be referred to as a speech-codec hereinafter) 9. In the speech-codec 9, speech decoding of the digital speech signal is performed. The speech signal output from the speech-codec 9 is converted into an analog speech signal by a D/A converter (not shown) and input to an analog switch 10. When a digital mode is set, the analog switch 10 is switched and controlled to selectively output an analog speech signal output from the speech-codec 9 in response to a control signal SW1 output from the controller 20. Therefore, the speech signal output from the speech-codec 9 is supplied to a loudspeaker 11 via the analog switch 10 to be produced and output from the loudspeaker 11.

A transmission speech signal obtained such that a voice of a speaker is picked up by a microphone 12 and converted into an electric signal is input to an analog switch 13. At this time, when a digital mode is set, the analog switch 13 is switched and controlled to supply the transmission speech signal to the speech-codec 9 in response to the control signal SW1 output from the controller 20. Therefore, the transmission speech signal is converted into a digital speech signal by an A/D converter (not shown) via the analog switch 13 and input to the speech-codec 9. The speech-codec 9 performs speech encoding of the digital speech signal. The digital speech signal output from the speech-codec 9 is input to the channel-codec 8 together with a digital control signal output from the controller 20. This channel-codec 8 performs error correction encoding of the digital speech signal and digital control signal. The encoded digital speech signal is input to a digital modulator 14. In the digital modulator 14, a modulation signal which is modulated by π/4 shifted DQPSK is generated in response to the digital speech signal, and this modulated signal is converted into an analog signal by a D/A converter (not shown) and input to a transmitter 5. In the transmitter 5, the modulated signal is synthesized with a transmission local oscillation signal corresponding to a radio frequency of a digital speech channel output from the frequency synthesizer 4 so as to be converted into a radio transmission signal and to be amplified into a high-frequency signal. The radio transmission signal output from the transmitter 5 is supplied to the antenna 1 via the duplexer 2 and transmitted from the antenna 1 to a base station.

On the other hand, when an analog mode is set, a radio frequency signal sent from a base station via an analog speech channel is received by the antenna 1 and input to the receiver 3 via the duplexer 2, and this signal is down-converted into an intermediate frequency signal by the receiver 3. The reception intermediate frequency signal output from the receiver 3 is input to an analog audio circuit 15. In this analog audio circuit 15, the reception intermediate frequency signal is FM-demodulated and audio-amplified. A baseband analog speech signal output from the analog audio circuit 15 is input to the analog switch 10. At this time, when the analog mode is set, the analog switch 10 is switched and controlled to selectively output the analog speech signal in response to a control signal output from the controller 20. Therefore, the analog speech signal output from the analog audio circuit 15 is supplied to the loudspeaker 11 via the analog switch 10 and is produced and output from the loudspeaker 11.

A transmission speech signal obtained such that a voice of a speaker is picked up by the microphone 12 and converted into an electric signal is input to the analog switch 13. At this time, when an analog mode is set, the analog switch 13 is switched and controlled to supply the transmission speech signal to the analog audio circuit 15 in response to a control signal output from the controller 20. Therefore, the transmission speech signal is input to the analog audio circuit 15 via the analog switch 13. In the analog audio circuit 15, a signal FM-modulated in response to the transmission speech signal is generated and input to the transmitter 5. In the transmitter 5, the modulated signal is mixed with a transmission local oscillation signal corresponding to the radio frequency of an analog speech channel generated by the frequency synthesizer 4 and is up-converted into a radio frequency signal. The radio signal is amplified into a high-frequency signal. The radio frequency signal output from the transmitter 5 is supplied to the antenna 1 via the duplexer 2 and transmitted from the antenna 1 to a base station.

A console unit 16 includes key switches 17 and a display 18. The display 18 consists of, e.g., a liquid crystal display. The key switches 17 include a send (SND) key 17A, an end key 17B, a dial key 17C, and a mode designation (MIN) key 17D. The mode designation key 17D is used when a user selectively designates and inputs an analog mode, a digital mode, or a dual mode in which a mode is not specifically designated. A power source circuit 10A generates a predetermined operation voltage VCC on the basis of an output from a battery 19b to supply it to the above circuits.

The controller 20 has a microprocessor (MPU) 21. A ROM 22, a RAM 23, and an input/output (I/O) port 24 are connected to this microprocessor 21 via a bus 25. All control programs required for radio communication and a part of control data are stored in the ROM 22 in advance. Data input with the keys 17 and reception control data are stored in the RAM 23. The microprocessor 21 executes various control operations related to radio communication in accordance with the control programs and control data stored in the ROM and the control data stored in the RAM 23. The control operations include a series of control operations related to a change in mode which is a characteristic feature of the present invention.

An operation of the portable telephone unit arranged as described above will be described in accordance with the control sequence of the controller 20.

Figure 3:
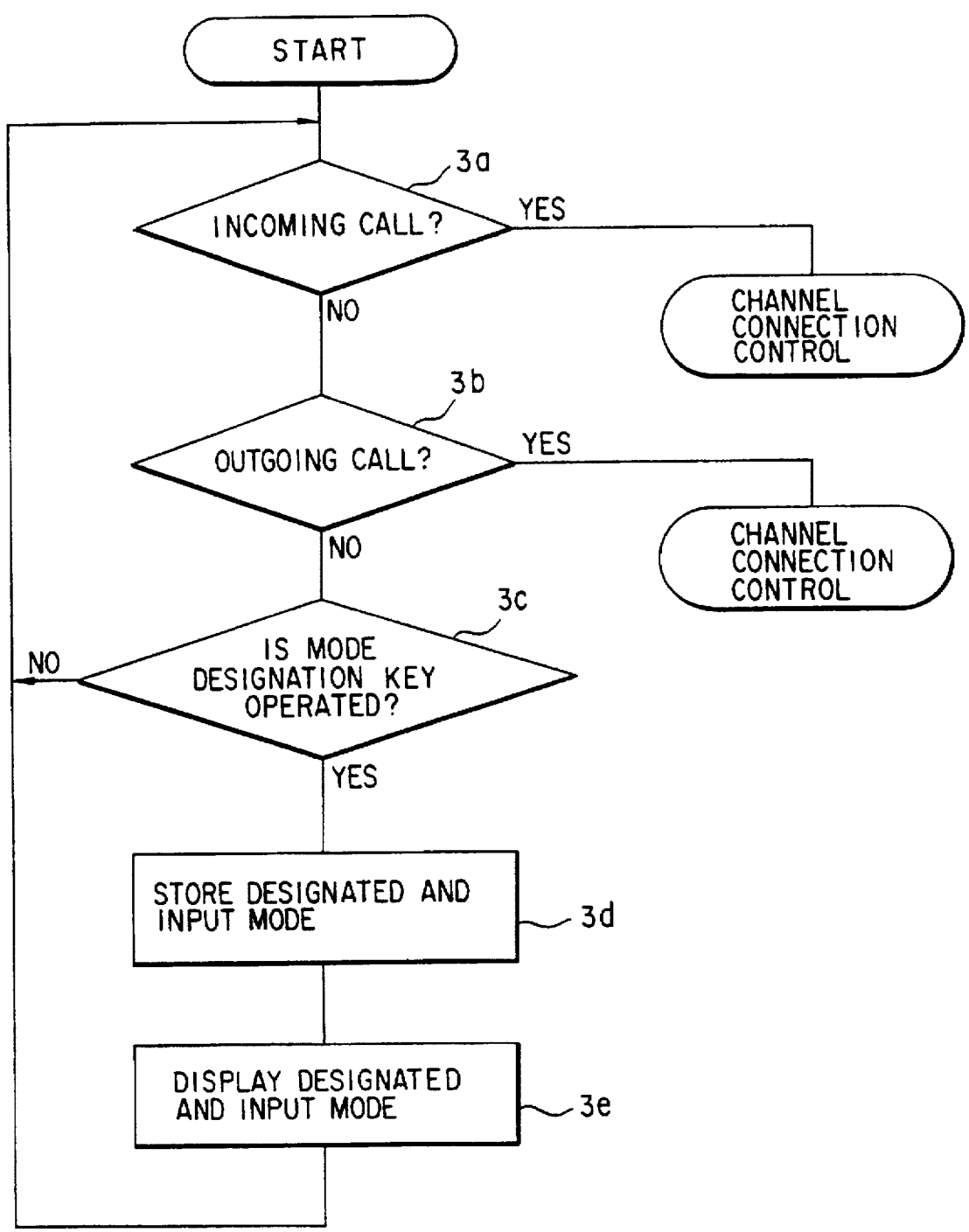
FIG. 3 is a flow chart showing a wait/reception control sequence in a control circuit in the portable telephone shown in FIG. 2.
Figure 12A:
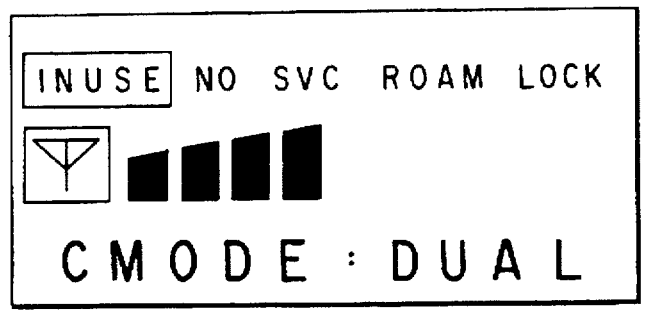
FIGS. 12A to 12F are views showing display results of the modes of the portable telephone shown in FIG. 2.

In a waiting state (ON-hook state), as shown in FIG. 3, the controller 20 monitors in step 3a whether an incoming call is received from the base stations BS1 to BS4, in step 3b whether a calling operation is performed, and in step 3c whether the mode designation key 17D is operated. In this state, when the mode designation key 17D is operated, the flow advances to step 3d and step 3e in the controller 20. In step 3d, a desired mode designated and input by the mode designation key 17D is stored in the RAM 21 in the controller 20. In step 3e, a display pattern representing the desired mode designated and input by the mode designation key 17D is displayed on the display 18. For example, when a user designates and inputs a dual mode as a desired mode, the display 18 displays "CMODE : DUAL" as shown in FIG. 12A.

Figure 4:
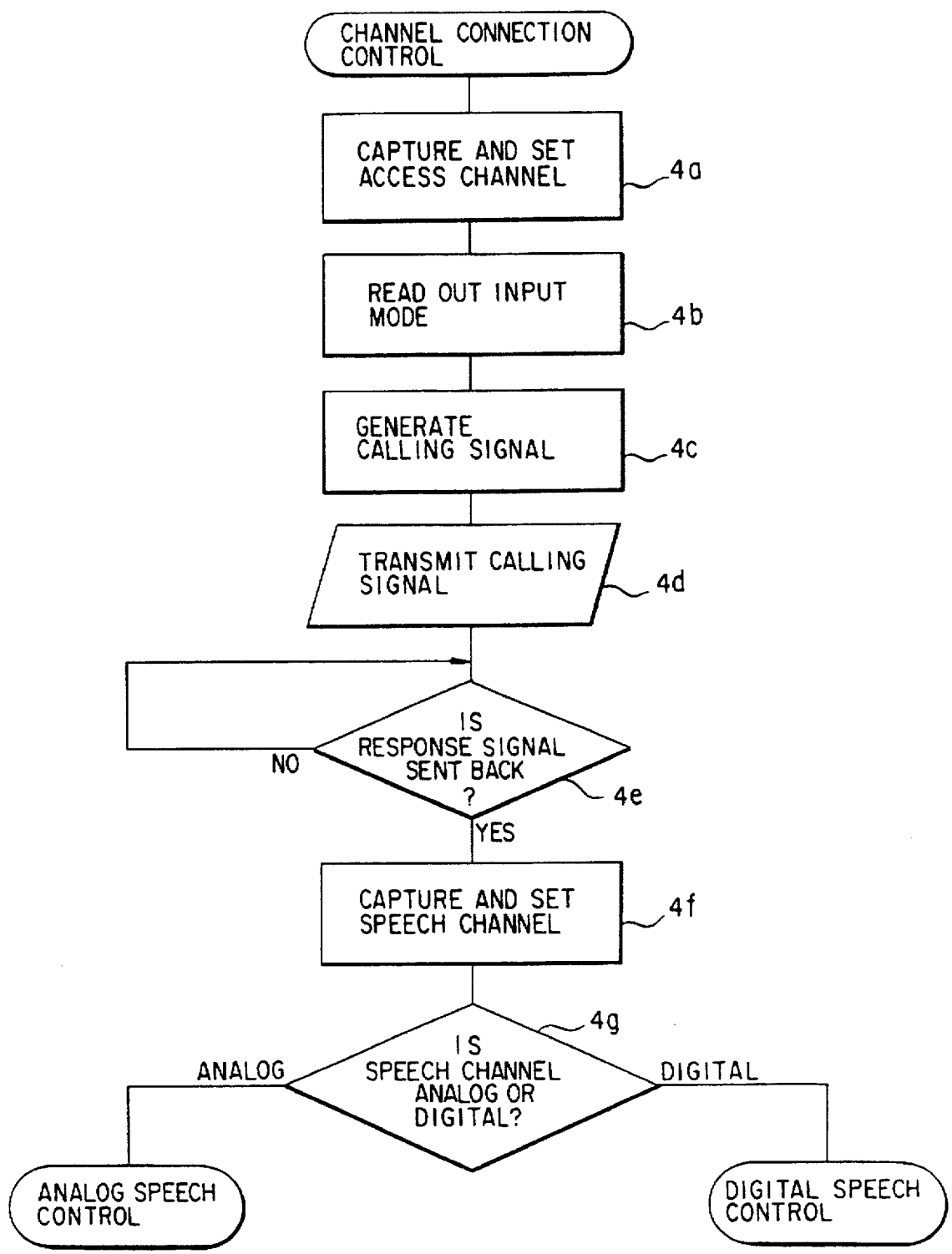
FIG. 4 is a flow chart showing a sequence of channel connection control in the control circuit in the portable telephone shown in FIG. 2.

In this state, for example, after the user operates the dial key 17C to input the telephone number, the send (SND) key 17A is depressed. At this time, the controller 20 performs channel connection control in accordance with an calling operation to be described below. That is, as shown in FIG. 4, a control channel called an access channel is captured and set in step 4a. In step 4b, a designated input mode (desired mode) is read out from the RAM 23, and an calling signal including data representing the designated input mode is generated in step 4c. In step 4d, the generated calling signal is transmitted to a base station as indicated by reference symbol S in FIG. 9. After the calling signal is transmitted, in step 4e, the controller 20 monitors an calling response signal sent back from the base station. When the calling response signal is sent back from the base station, a corresponding speech channel is captured and set in accordance with speech channel designation data inserted in the calling response signal (step 4f). The controller 20 determines in step 4g whether the set speech channel is an analog speech channel or a digital speech channel, and the determination result is displayed on the display 18 in steps 4h and 4i. Thereafter, the operation of the controller 20 is shifted to analog speech control processing or digital speech control processing.

Figure 12B:
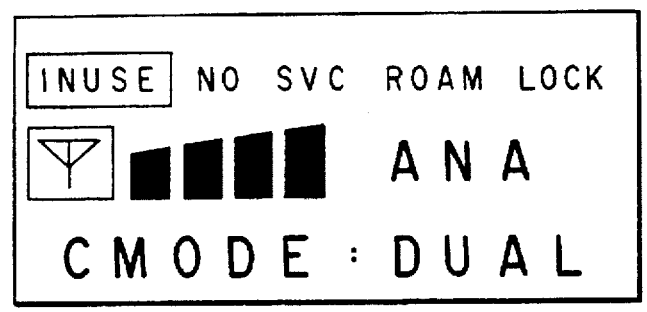
Figure 12C:
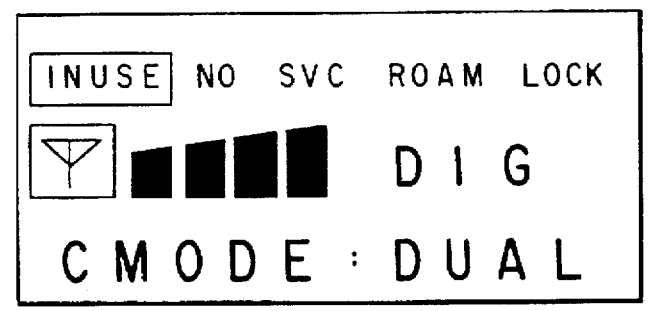

For example, at this time, when the dual mode is designated as a desired mode as described above, and an analog mode is designated by the base station in accordance with the designation of the dual mode. In this case, the controller 20 captures and sets the analog speech channel designated by the base station in step 4f. The set speech channel is determined in step 4g, and a display pattern "ANA" representing that the analog mode is set is displayed on the display 18 in accordance with the determination result in step 4h, as shown in FIG. 12B. Thereafter, the operation of the controller 20 is shifted to the analog speech control processing. On the other hand, when a digital mode is designated by the base station, the controller 20 captures and sets the designated display speech channel first in step 4f. The set speech channel is determined in step 4g, and a display pattern "DIG" representing that the digital mode is set is displayed on the display 18 in accordance with the determination result in step 4i, as shown in FIG. 12C. Thereafter, the operation of the controller 20 is shifted to the digital speech control processing.

Figure 5:
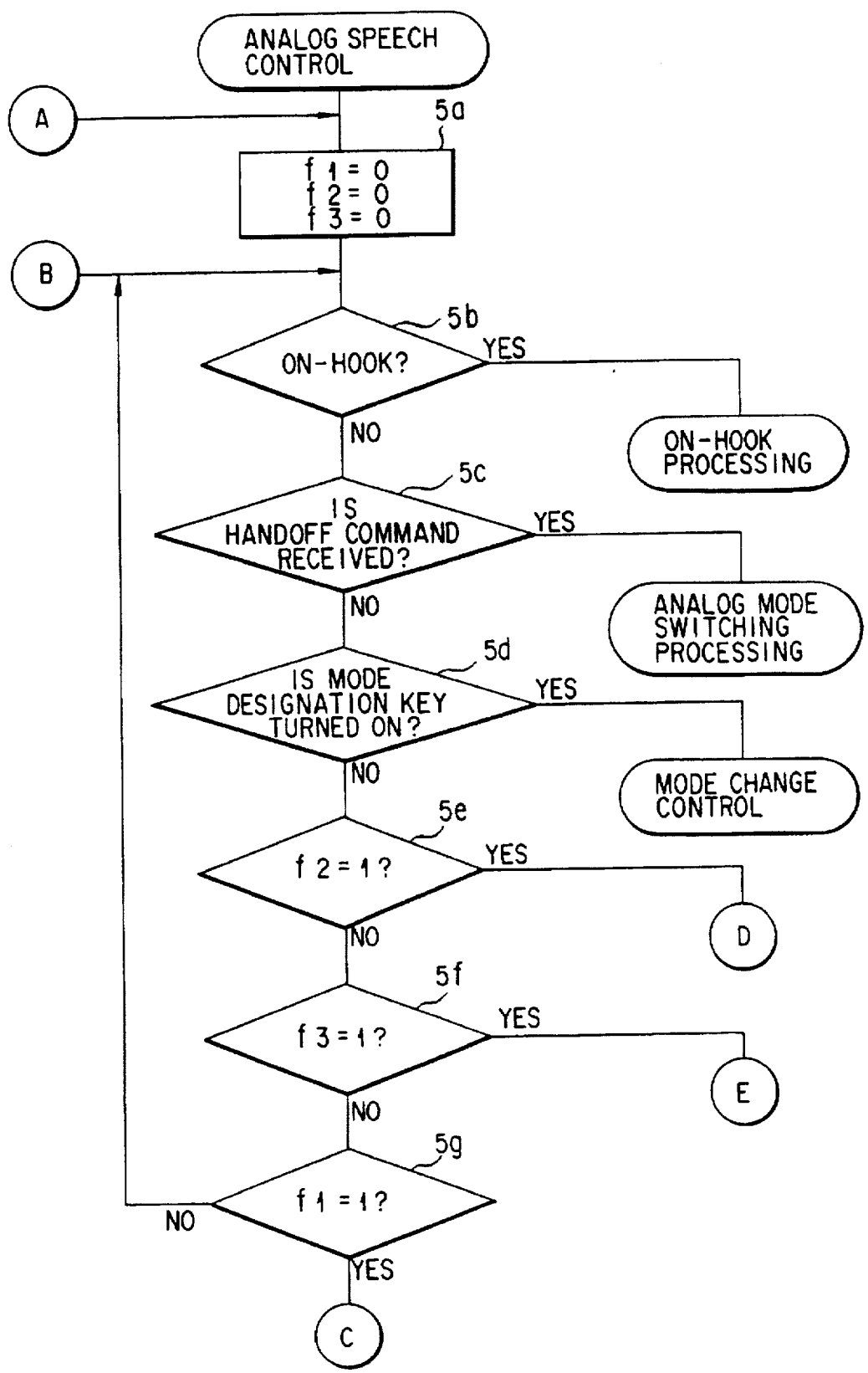
FIG. 5 is a flow chart showing a sequence of analog speech control in the control circuit of the portable telephone shown in FIG. 2.

It is assumed that the operation of the controller 20 is shifted to the analog speech control processing. At this time, the controller 20 resets control flags f1, f2, and f3 (f1=0, f2=0, and f3=0) in step 5a as shown in FIG. 5, and the determination operations in step 5b to step 5g are repetitively performed. That is, it is determined in step 5b whether an on-hook operation has been performed. It is determined in step 5c whether a handoff command signal from the base station has been received. It is determined in step 5d whether the mode designation key 17D has been operated. In addition, in steps 5e, 5f, and 5g, it is determined whether the control flags f1, f2, and f3 are set, respectively.

In this state, in order to switch a speech content from a normal speech to privacy speech, a user operates the mode designation key 17D to designate and input a "digital mode". In this case, the controller 20 detects this operation in step 5d, and its operation is shifted to mode change control processing.

Figure 12D:
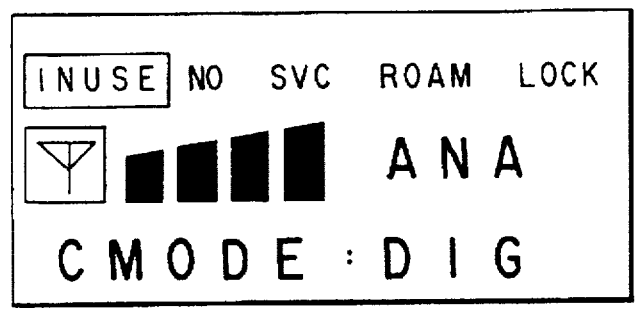

That is, the controller 20 stores the "digital mode" input by the mode designation key 17D in step 6a in the RAM 23 as a desired mode and causes the display 18 to display in step 6b a display pattern "CMODE : DIG" representing that the "digital mode" is designated. FIG. 12D shows this display at this time. As is apparent from the display, the "analog mode" currently used in communication and "digital mode" used as a desired mode are parallelly displayed. Therefore, the user can clearly confirm the mode currently used in communication and the desired mode designated and input by the mode designation key 17D.

In the controller 20, the flow advances to step 6c. It is determined in step 6c whether the mode currently used in communication coincides with the desired mode designated and input by the user with the mode designation key 17D. As shown in FIG. 12D, when these modes are different from each other, the controller 20 continues the mode change control processing. In contrast to this, when the mode currently used in communication coincides with the desired mode, the controller 20 determines that a mode change is not required. The controller 20 interrupts the mode change control processing and starts the analog speech control processing from step 5b to step 5g in FIG. 5 again. For this reason, if a user erroneously or mistakenly designates the same mode as a mode currently used in communication, unnecessary mode change control processing is not performed. Therefore, a mode change request message is not transmitted to the base station.

When it is determined in step 6c that the mode currently used in communication does not coincide with the desired mode, the flow advances to step 6d in the controller 20. In step 6d, a mode change request message including data representing the desired mode (digital mode) is generated and transmitted to the base station as indicated by reference symbol H0 in FIG. 9. At this time, the mode change request message is transmitted by interrupting or superposing it in or on an analog speech signal.

When the base station receives the mode change request message from a mobile unit, the base station determines whether speech channels in a mode requested by this message include any non-busy channel in accordance with the mode change request message. When a non-busy channel is found, a response message (ACK response message) representing acknowledgement of the change request is sent back, and a handoff command signal including data for designating the non-busy speech channel is generated and transmitted to the mobile unit in which the mode change has been requested. In contrast to this, when there is no non-busy channel of the desired mode, the mobile unit searches a non-busy channel of another mode. When the non-busy channel is found, the ACK response message is sent back, and a handoff command signal including data for designating the non-busy channel is generated and transmitted to the mobile unit.

When the mode change request message is transmitted, the controller 20 monitors the ACK response message sent back from the base station. That is, the control flag f2 representing that reception of the ACK response message is monitored is set in step 6e. In step 6f, it is determined whether a predetermined period of time T1 has elapsed after the mode change request message is transmitted. For example, the period of time T1 is set to be 200 msec. It is determined in step 6g whether the ACK response message has been received. In addition, before the lapse of the period of time T1 and during a time interval in which reception of the ACK response message is not detected, on-hook determination, determination of reception of a handoff command, and determination of the operation of the mode designation key 17D are performed in step 5b to step 5d, respectively. When all the determination results are set to be "NO", the flow returns from step 5e to step 6f, and a routine for monitoring reception of the ACK response message is repeated.

During execution of the routine, assume that the period of time T1 has elapsed without reception of the ACK response message. At this time, the flow advances to step 6h, and the controller 20 determines in step 6h whether the number of times that a mode change request message is retransmitted reaches three. If NO in step 6h, the flow returns to step 6d, and the mode change request message is sent for the second time as shown in FIG. 10. The mode change request message is repetitively sent by the maximum number of times, i.e., three times, until it is confirmed that the ACK response message is sent back. As shown in FIG. 10, when the ACK response message is not received even when the mode change request message is sent by three times, the flow advances to step 6i in the controller 20. In step 6i, the following abnormal processing is performed. That is, an alarm is generated from the loudspeaker 11, or the display 18 displays that a mode change cannot be performed. According to the abnormal processing, a user can know that a mode change request has not been received. Upon execution of the abnormal processing, the operation of controller 20 is returned to analog speech control processing performed from step 5a to step 5g in FIG. 5. The above abnormal operation is caused by the following reasons. For example, the base station is set in a state in which the mode change request message cannot be received, or the base station is abnormally operated.

Figure 6:
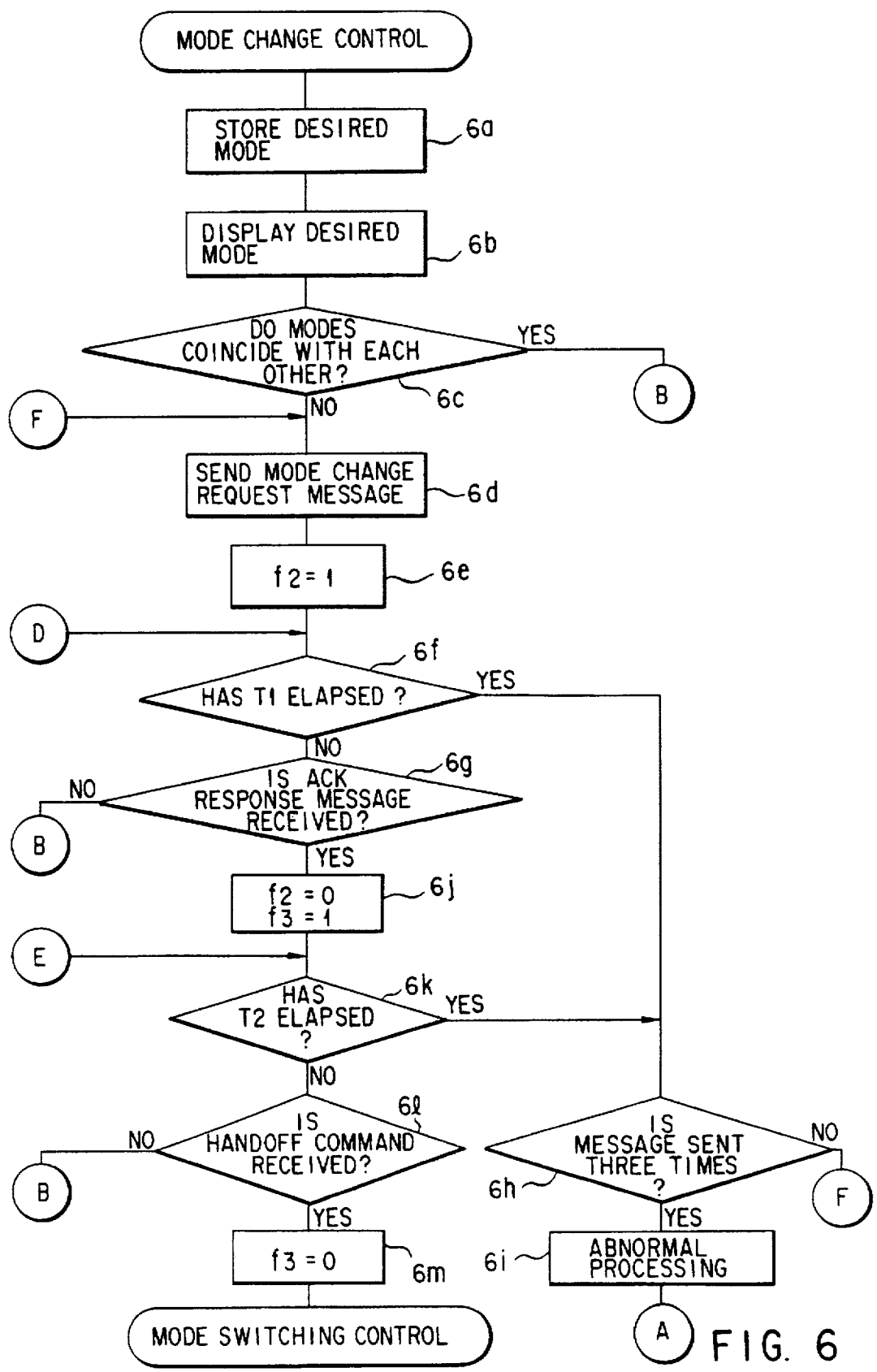
FIG. 6 is a flow chart showing a sequence of mode change control in the control circuit of the portable telephone shown in FIG. 2.

During execution of reception monitoring routine of the ACK response message, when a user depresses the mode designation key 17D, the controller 20 restarts the mode change control processing shown in FIG. 6.

In contrast to this, it is assumed that the ACK response message is sent back from the base state in response to transmission of the mode change request message. The controller 20 monitors reception of a handoff command signal which is to be sequentially sent back from the base station. That is, in step 6j, the control flag f2 representing that the reception of the ACK response message is being monitored is reset, and the control flag f3 representing that the reception of the handoff command signal is being monitored is set in place of the flag f2. In step 6k, it is determined whether a predetermined period of time T2 has elapsed after the mode change request message is received. For example, the period of time T2 is set to be 100 msec. In step 6l, it is determined whether a handoff command signal is received. In addition, before the lapse of the period of time T2 and during a time interval in which reception of the handoff command signal is not detected, on-hook determination, determination of reception of a handoff command, and determination of the operation of the mode designation key 17D are performed in step 5b to step 5d in FIG. 5, respectively. When all the determination results are set to be "NO", the flow returns from step 5f to step 6k, and a routine for monitoring reception of the handoff command signal is repeated.

During execution of the routine, assume that the period of time T2 has elapsed without reception of the handoff command signal. At this time, as in the reception monitoring routine of the ACK reception message, the flow advances to step 6h, it is determined in step 6h whether the number of times that a mode change request message is retransmitted reaches three. If NO in step 6h, the flow returns to step 6d, and the mode change request message is sent for the second time as shown in FIG. 11. The mode change request message is repetitively sent by the maximum number of times, i.e., three times, until it is confirmed that the handoff command signal is received. As shown in FIG. 11, when the handoff command signal is not received even when the mode change request message is sent by three times, the flow advances to step 6i in the controller 20 and abnormal processing is performed in step 6i. According to the abnormal processing, a user can know that a mode change request has not been received. Upon execution of the abnormal processing, the operation of the controller 20 is returned to analog speech control processing performed in step 5a to step 5g in FIG. 5. The above abnormal operation may be caused by, e.g., an abnormal operation of the base station.

During execution of reception monitoring routine of the handoff command signal, when a user depresses the mode designation key 17D, the controller 20 restarts the mode change control processing shown in FIG. 6.

when the handoff command signal is sent back, the controller 20 performs mode switching processing. That is, as shown in FIG. 7, in step 7a, it is determined whether a speech channel designated by the handoff command signal is a channel corresponding to a desired channel, i.e., a digital mode. When the speech channel is the desired digital speech channel, the flow advances to step 7b in the controller 20. In step 7b, a corresponding digital speech channel is captured in accordance with speech channel designation data included in the handoff command signal, and the transmission and reception timings of the digital speech channel are adjusted.

Figure 12E:
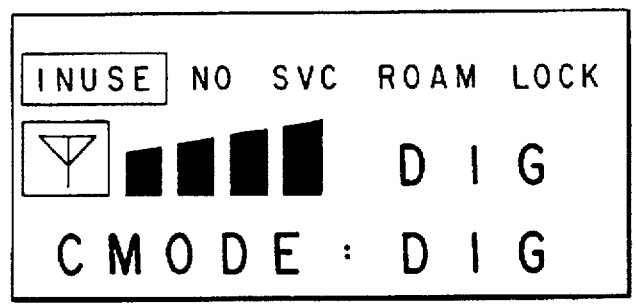
Figure 12F:
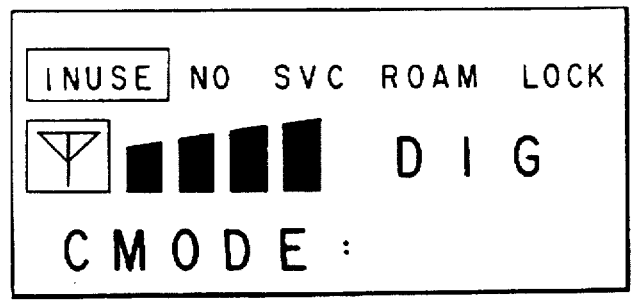

Upon this adjustment, processing for switching an analog speech channel currently used in communication to the new digital speech channel in synchronization with the base station is performed. While the switching processing of the speech channels is performed, a switching control signal SW1 for switching the analog switches 10 and 13 from the analog audio circuit 15 to the speech-codec 9 is output from the controller 20 to the analog switches 10 and 13. For this reason, the loudspeaker 11 and the microphone 12 are connected to the speech-codec 9 accordingly. This switching processing is completed, as shown in FIG. 12E, the controller 20 causes the display 18 to display in step 7c a display pattern "DIG" representing the switched digital mode, and the controller 20 starts digital speech control processing. In step 7c, in order to represent that the mode change processing for a desired mode is completed, "CMODE : DIG" displayed on the display 18 may be erased as shown in FIG. 12F.

Figure 9:
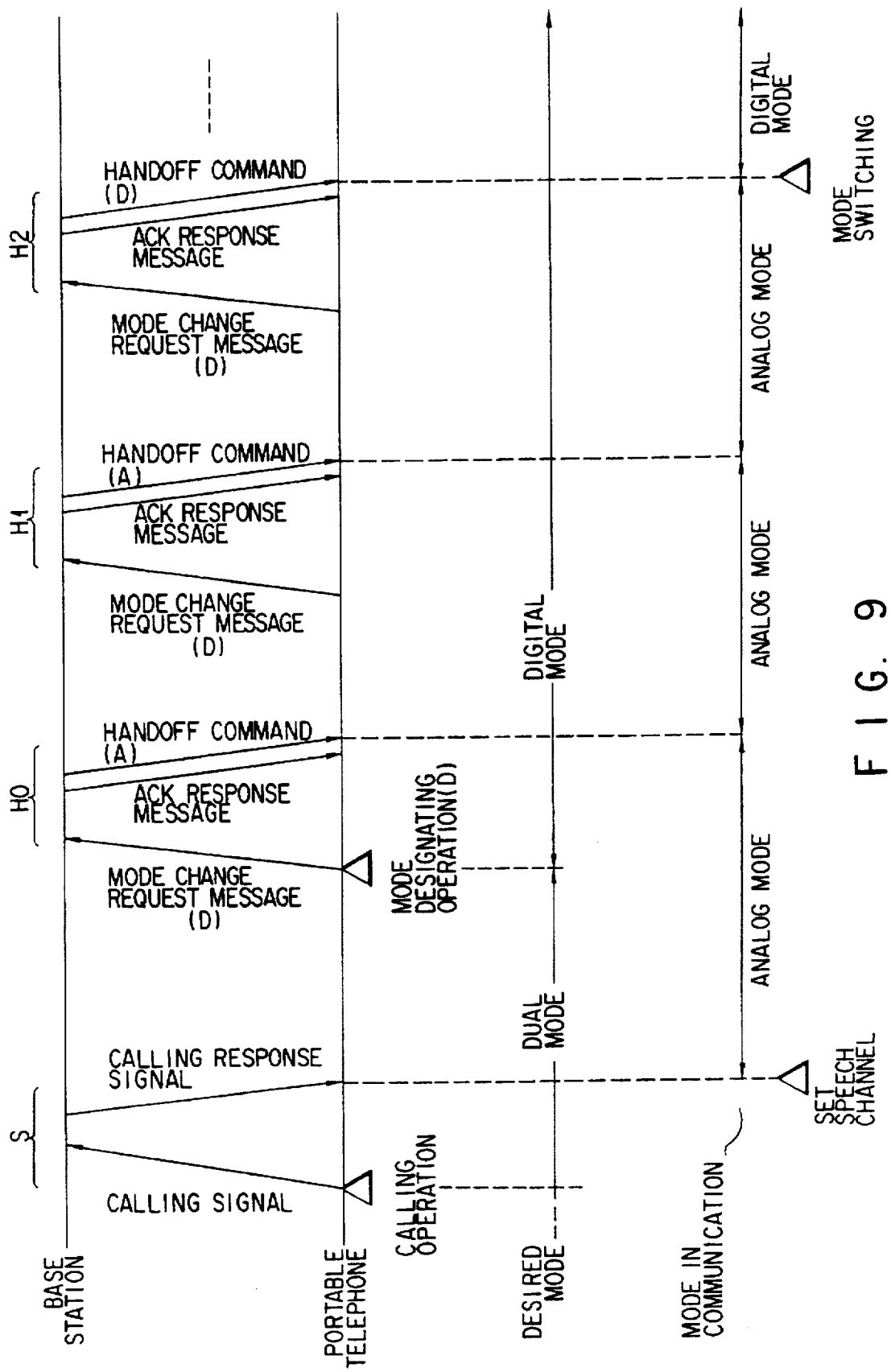
FIG. 9 is a view showing a mode change sequence of the portable telephone shown in FIG. 2.

On the other hand, if there is no non-busy digital speech channel, a speech channel of the analog mode different from the desired mode is designated in response to the handoff command signal as indicated by reference symbol H0 in FIG. 9. In this case, the flow advances from step 7a to step 7d in the controller 20, and the control flag f1 representing that retransmission of the mode request message is being controlled is set (f=1). Thereafter, mode switching processing is performed in step 7e. That is, in step 7e, a corresponding digital speech channel is captured in accordance with speech channel designation data included in the handoff command signal, and processing for switching the current speech channel to a new analog speech channel in synchronization with the base station is performed. When this switching of the speech channels is completed, the controller 20 causes the display 18 to display in step 7f a display pattern "ANA" representing that the switched mode is an analog mode. After a timer is started in step 7g, it is determined in step 7h whether the timer is timed out. A measurement time of the timer is set to be, e.g., 30 seconds. If NO in step 7h, determination operations in steps 5b to 5d of FIG. 5 are performed. All the determination results are set to be "NO", the flow returns from step 5g to step 7h, a control routine for retransmitting the mode change request message is repeated subsequently.

Assume that 30 seconds have elapsed after the control routine is executed, and the timer is timed out. At this time, the flow advances from step 7h to step 7i in the controller 20, and the controller 20 determines whether the number of times of time-out reaches five. When the number of times does not reach five, the flow advances to step 6d in FIG. 6. At this time, a mode change request message for requesting a change in mode to a digital mode is sent to the base station as indicated by reference symbol H1 in FIG. 9. That is, when a desired mode is not designated by the base station in response to the above mode change request, a mode change request message is automatically retransmitted.

When this retransmission of the mode change request message is performed, in steps 6e to 6l, the controller 20 monitors the ACK response message and the handoff command signal which are sent back from the base station. In this state, when the ACK response signal and the handoff command signal are sequentially sent back, the controller 20 performs the channel switching processing shown in FIG. 7. The controller 20 determines in step 7a whether the mode of a speech channel designated by the new handoff command signal is a desired digital mode. As a result of the determination, as indicated by reference symbol H1 in FIG. 9, assuming that an analog speech channel is designated again, the controller 20 executes channel switching processing to a new analog speech channel designated by the handoff command signal in the steps 7d to 7f. After the timer is restarted in step 7g, the flow advances from step 7h to step 5b, and steps 5b to 5g are performed. Thereafter, a control routine for returning the flow to step 7h is executed.

During execution of the control routine, when 30 seconds have elapsed to time out the timer, the controller 20 determines in step 7i whether the number of times of time-out reaches five. If NO in step 7i, the flow advances to step 6d in FIG. 6, and a mode change request message for requesting a change in mode to a digital mode is sent to the base station for the third time as indicated by reference symbol H2 in FIG. 9. Thereafter, as in this manner, the transmission operation of the mode change request message is repeated by the maximum number of times, i.e., five times, at a time interval of 30 seconds until a speech channel of a desired mode is designated by the base station.

It is assumed that a non-busy digital speech channel is found by the base station in response to the third transmission of the mode change request message. At this time, after the base station sends back the ACK response message, a handoff command signal including data for designating the non-busy digital speech channel is generated and sent to the mobile unit as indicated by reference symbol H2 in FIG. 9. In this case, the controller 20 of the mobile unit receives the handoff command signal in step 6l, and the flow advances to step 7a. In step 7a, it is determined whether a speech channel designated by the received handoff command signal is a speech channel of a desired digital mode. If YES in step 7a, the flow advances from step 7a to steps 7b and 7c. In step 7b, channel switching processing for switching an analog speech channel to a digital speech channel is performed. In step 7c, the switched digital mode is displayed on the display 18. As shown in FIG. 9, a mode of the mobile unit is switched from an analog mode to a digital mode, and the mobile unit can perform, e.g., privacy speech communication, in the digital mode.

Figure 8:
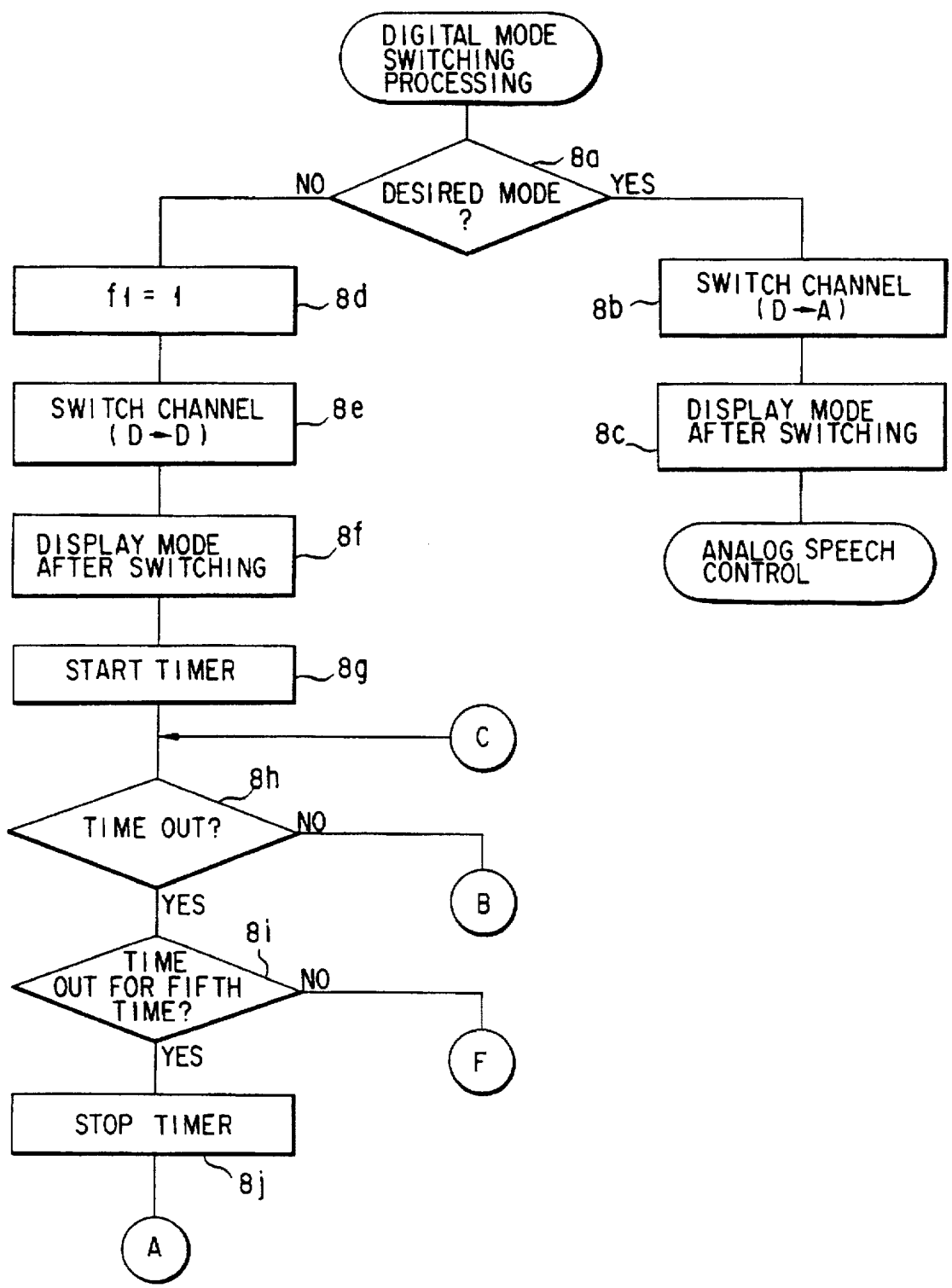
FIG. 8 is a flow chart showing a sequence of digital mode switching control in the control circuit of the portable telephone shown in FIG. 2.

When a mode change operation for switching a state in which speech is performed in the digital mode to a state in which speech is performed in the analog mode is performed, control processing is the same as that performed when a mode change is performed from the analog mode to the digital mode except for the channel switching processing shown in FIG. 8.

As described above, according to this embodiment, since a mode change request message is sent, when a handoff command signal for designating a switching operation to an undesired mode is received from the base station, the mode change request message is sent again. For this reason, when the first mode change request message is sent, there is no non-busy speech channel, and a handoff operation to the desired mode is not performed. In this case, the handoff operation to the desired mode can be performed by retransmission of the mode change request message. At this time, the retransmission of the mode change request message is automatically performed. For this reason, a user need not particularly re-operate the mode designation key 17D, and the operational load on the user can be reduced, thereby improving operability. In addition, the retransmission of the mode change request message is performed upon a lapse of sufficient time, i.e., 30 seconds, after the first mode change request message is sent. For this reason, a probability of finding a non-busy speech channel corresponding to the desired mode in the base station can be increased. Therefore, as opposed to the case wherein a mode change request message is retransmitted immediately after a handoff command signal to an undesired mode is sent back from the base station, a probability of performing a handoff operation to the desired mode by the first retransmission of the mode change request message can be increased.

In this embodiment, retransmission of a mode change request message is controlled to be repetitively performed with a predetermined period of time (30 seconds) until a handoff command signal to a desired mode is received. For this reason, for example, even if the base station has a high traffic, and a handoff operation to the desired mode is not performed by the first retransmission, the handoff operation to the desired mode can be almost reliably achieved by the second or subsequent retransmission.

The number of times that a mode change request message is retransmitted is limited to a maximum of five. For this reason, when the base station cannot control a handoff operation due to some reason, semi-permanent repetition of unnecessary control can be prevented. As one of the reasons, the base station is a base station for only an analog mode or a base station for only a digital mode, and the base station has no speech channel of another mode.

In this embodiment, in the step immediately after mode change control processing is started, a mode designated and input by the mode designation key 17D is compared with a mode currently used in communication. As a result, when both the modes coincide with each other, it is determined that a mode change is not required, and speech control is restarted without performing the main step of controlling a mode change. For this reason, even when a user erroneously or mistakenly designates and inputs the same mode as the mode currently used in communication, unnecessary mode change control processing is not performed. Therefore, since any mode change control processing is not substantially performed in a portable telephone unit, unnecessary power consumption is reduced, and the service life of the battery 19 can be prolonged. In addition, since no mode change request message is transmitted from the portable telephone unit to the base station, instantaneous interruption of the voice of speech caused by transmission of a mode change request message does not occur, and the quality of speech is nod degraded. In the base station, since no mode change request message is transmitted from the portable telephone unit, mode change control processing is not performed. For this reason, another processing is not waited in the base station, and no delay occurs in processing.

In this embodiment, a desired mode designated and input by the mode designation key 17D and a mode currently used in communication are parallelly displayed on the display 18. For this reason, a user can confirm the mode currently used in communication while performing communication. Therefore, speech or communication suitable for the set mode can be performed. For example, after the user confirms that a digital mode is set, privacy speech can be performed. After the user confirms that an analog mode is set, facsimile communication can be performed in an analog communication mode.

During communication, a user can perform an operation for a mode change after the user confirms the mode currently used in communication on the display 18. For this reason, the same mode as the mode currently used in communication is rarely designated and input. Therefore, an increase in power consumption is prevented in the portable telephone unit, and the service life of the battery 19 is prolonged, thereby prolonging the continuous service life of the portable telephone unit. In the base station, a time loss is prevented in processing, and other control processing operations which must be performed are not adversely affected by a processing delay or the like.

In this embodiment, when no ACK response message is sent back from the base station, transmission of a mode change request message is automatically repeated by the maximum number of times, i.e., three times. In addition, although the ACK response message is sent back from the base station, when a handoff command signal is not sent back, the transmission of a mode change request message is automatically repeated by the maximum number of times, i.e., three times. Therefore, when no mode change request message is received by the base station due to temporary interruption of waves caused by, e.g., fading, or an ACK response message or a handoff command signal sent from the base station does not reach the portable telephone unit, the ACK response message and the handoff command signal can be reliably received by the portable telephone unit.

(Second Embodiment)

Figure 13:
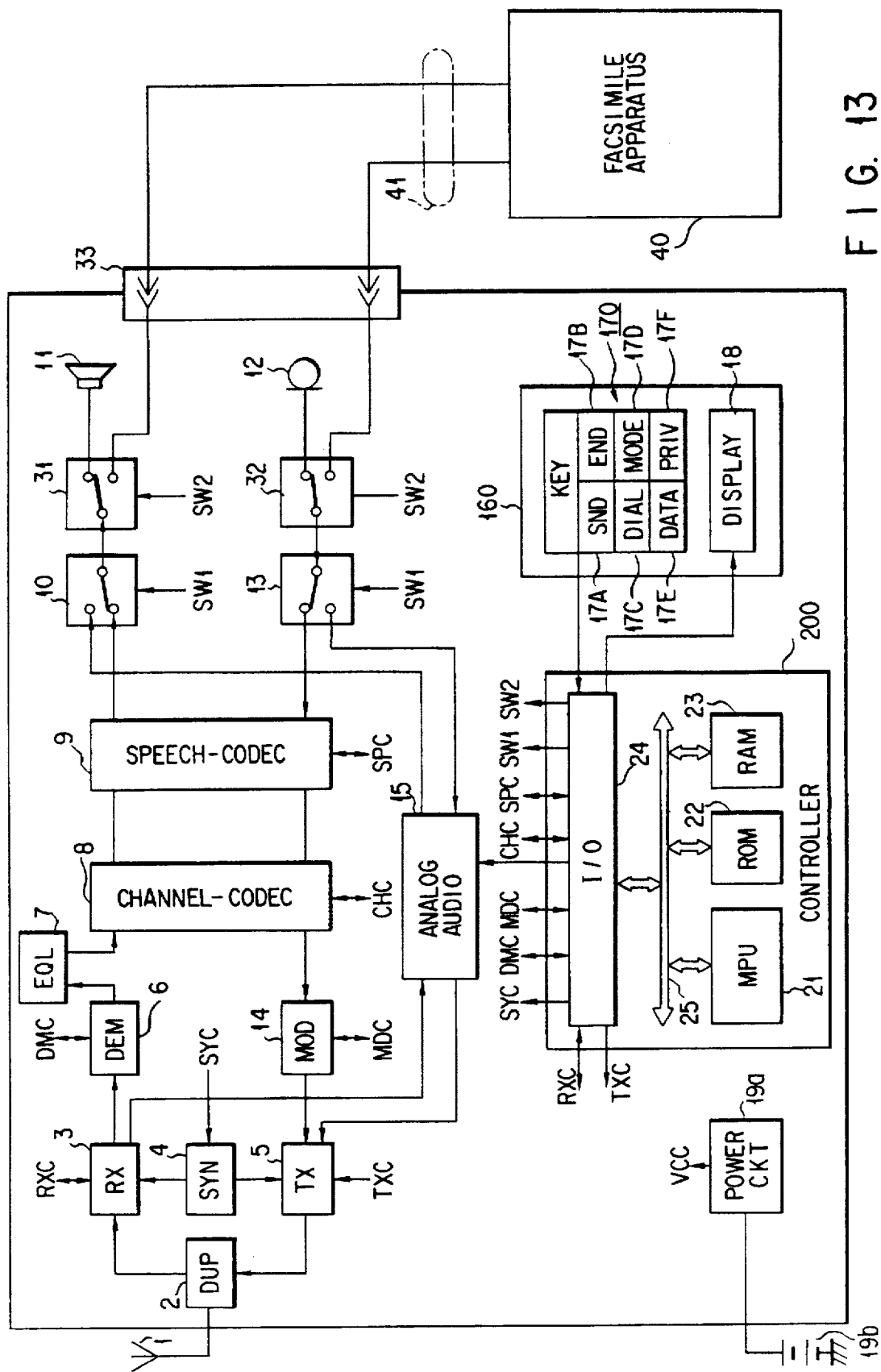
FIG. 13 is a block diagram showing an arrangement of a portable telephone according to the second embodiment of the present invention.

FIG. 13 is a block diagram showing an arrangement of a portable telephone system according to the second embodiment of the present invention. The same reference numerals as in FIG. 2 denote the same parts in FIG. 13, and a description thereof will be omitted.

A portable telephone unit according to this embodiment has an external connection terminal 33. A facsimile device 40 is connected to the external connection terminal 33 via a connection cord 41. An analog switch 31 is connected between an analog switch 10 and a loudspeaker 11, and an analog switch 32 is connected between the microphone 12 and the analog switch 13. In response to a control signal SW2 output from a controller 200, the analog switch 31 is switched such that an analog speech signal output from the analog switch 10 is output to the loudspeaker 11 in a speech state and the analog speech signal output from the analog switch 10 is output to the facsimile device 40 via the external connection terminal in a data communication state. In response to the control signal SW2 output from the controller 200, the analog switch 32 is switched such that an analog transmission speech signal output from the microphone 12 is output to the analog switch 13 in the speech state and a facsimile signal input from the facsimile device 40 via the external connection terminal 33 is output to the analog switch in the data communication state.

Key switches 170 of a console unit 160 consist of a send (SND) key 17A, an end key 17B, a dial key 17C, a mode designation (MODE) key 17D, a data communication (DATA) key 17E, and a privacy (PRIV) key 17F. The mode designation key 17D is used when a user selectively designates and inputs an analog mode, a digital mode, or a dual mode in which a mode is not specifically designated. The data communication key 17E is used to input a request for performing data communication using data communication equipments such as the facsimile device 40 connected to the external connection terminal 33. The privacy key 17F is used to input a request for performing privacy speech.

An operation of the portable telephone system arranged as described above will be described below according to the control sequence of the controller 200. Note that a description will be made assuming that the portable telephone unit is set in a speech state in a digital or analog mode.

Figure 14:
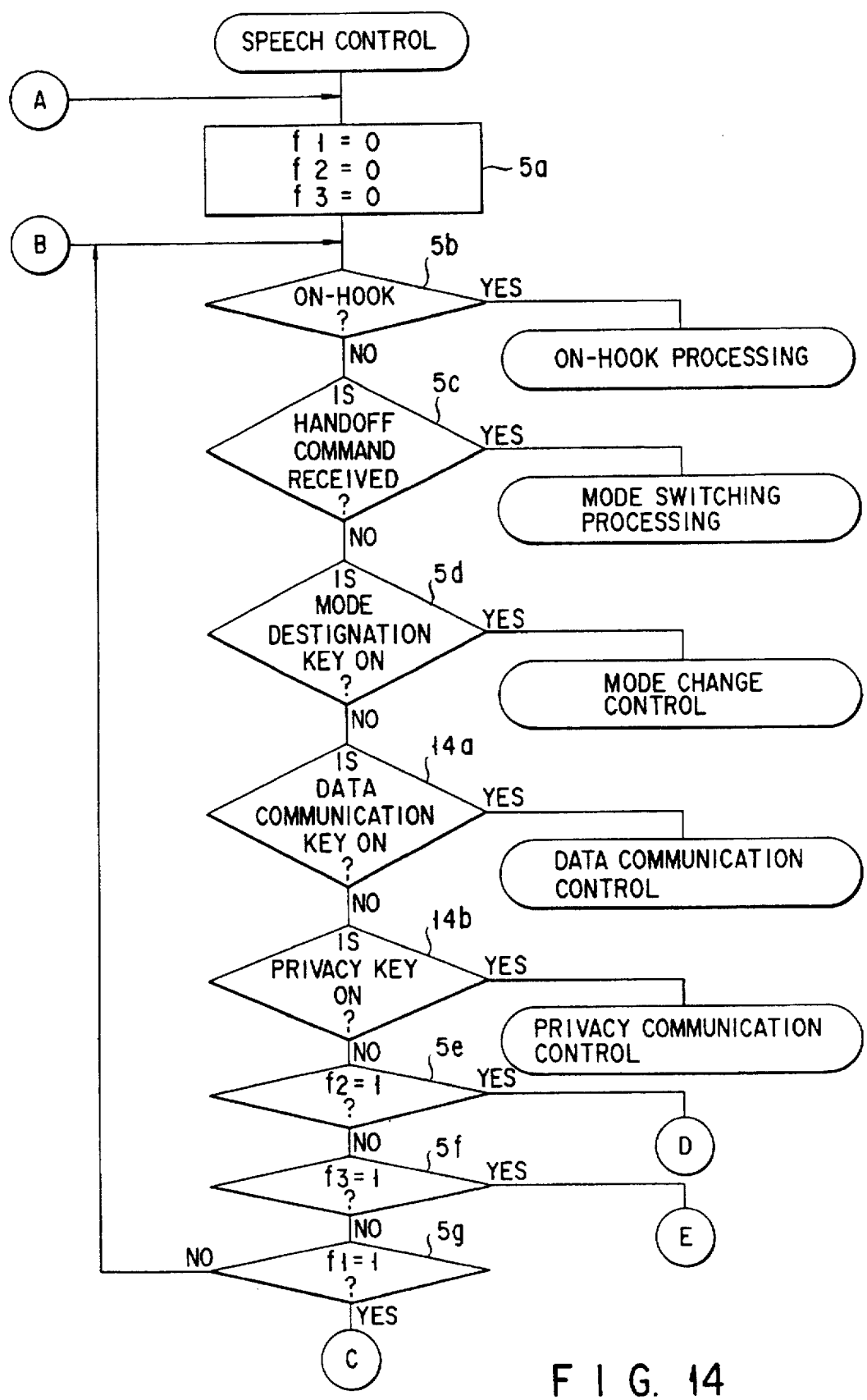
FIG. 14 is a flow chart explaining the sequence of the speech control performed by the control circuit incorporated in the portable telephone of FIG. 13.

In the speech state in the digital mode, after the controller 200 resets control flags f1, f2, and f3 (f1=0, f2=0, and f3=0) in step 5a as shown in FIG. 14, various discrimination operations in steps 5b to 5g are repetitively performed. That is, in step 5b, it is determined whether an on-hook operation is performed. In step 5c, it is determined whether a handoff command signal is received from a base station. In step 5d, it is determined whether the mode designation key 17D is operated. In step 14a, it is determined whether the data communication key 17E is operated. In step 14b, it is determined whether the privacy key 17F is operated. In steps 5e, 5f, and 5g, it is determined whether the control flags f1, f2, and f3 are set, respectively.

In this state, when a user depresses the data communication key 17E to shift the operation from speech to facsimile communication, the controller 200 performs control for the data communication in accordance with the sequence shown in FIG. 15. That is, in step 15a, the controller 200 determines whether a mode currently used in communication is an analog mode. As a result, when an analog mode is set, the controller 200 determines that the operation is directly shifted to the facsimile communication, and the flow advances to step 15e. In step 15e, the analog switches 31 and 32 are switched from the loudspeaker 11 and the microphone 12 to the external connection terminal 33.

In contrast to this, if the mode currently used in communication is set in a digital mode as described above, the controller 200 determines that the mode must be changed to an analog mode suitable for facsimile communication, and the controller 200 performs mode change processing in step 15b. In step 15b, the processing from step 6d to step 6m of FIG. 6 described in the first embodiment is performed. That is, in step 6d, a mode change request message for requesting a change from the digital mode to the analog mode is formed and transmitted to the base station. In steps 6e to 6g, it is monitored whether a change request acknowledgement (ACK) response message is sent back from the base station in response to the mode change request message. When it is detected that the ACK response message is sent back, it is monitored in steps 6j to 6m that a handoff command signal is received from the base station. When this handoff command signal is received, the operation of the controller is shifted to step 15c.

In step 15c, digital mode switching processing is performed in accordance with a sequence shown in FIG. 8. That is, in step 8a, it is determined whether a speech channel designated by the handoff command signal is a channel corresponding to a desired mode, i.e., an analog mode. As a result, when a mode designated by the base station is a desired analog mode, the corresponding analog speech channel is captured in step 8b in accordance with speech channel designation data included in the hand off command signal. After the analog speech channel is captured, processing for switching a digital speech channel currently used in communication to the new analog speech channel is performed in synchronization with the base station. In addition, while the switching processing between the speech channels is performed, the controller 200 outputs a switching control signal SW1 to the analog switches 10 and 13, thereby switching the analog switches 10 and 13 from a speech-codec 9 to an analog audio circuit 15. This switching operation is completed, a display pattern "ANA" representing an analog mode after the switching operation is displayed on a display 18. In step 8a, when it is found that a speech channel in a digital mode which is different from the desired mode is designated by the base station, processing for retransmitting a mode change request message is automatically performed in steps 8d to 8j.

Figure 17:
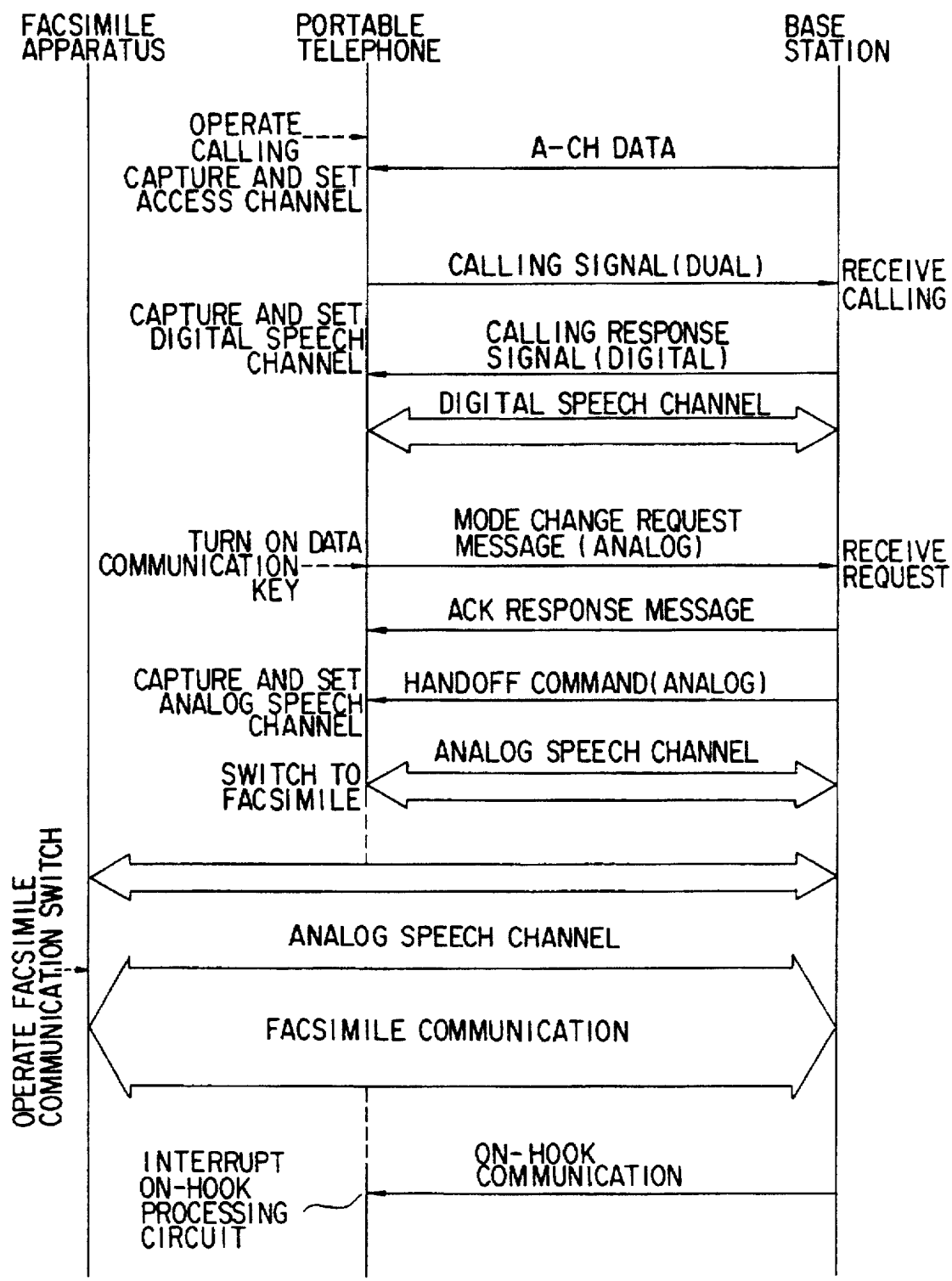
FIG. 17 is a flow chart illustrating the sequence of the data communication carried out by the portable telephone of FIG. 13.

When the mode change processing is completed as described above, the flow advances from step 15c to step 15e through step 15d in the controller 200. In step 15e, the controller 200 outputs the switching control signal SW2 to the analog switches 31 and 32. As a result, the analog switches 31 and 32 are switched from the loudspeaker 11 and the microphone 12 to the external connection terminal 33, respectively. Therefore, the facsimile device 40 is connected to the analog audio circuit 15 of the portable telephone unit subsequently. After the switching operation to the facsimile device 40 is performed, the controller 200 causes the display 18 to display a display pattern representing that facsimile communication is available by the controller 200 in step 15f. As a result, a user can know that the facsimile communication is available. In this state, when the user depresses a transmission switch (not shown) of the facsimile device 40, the facsimile device 40 starts a facsimile transmitting operation. Therefore, a facsimile signal output from the facsimile device 40 is transmitted to an analog speech channel connecting the portable telephone unit to the base station subsequently. During the facsimile communication, the controller 200 of the telephone unit monitors reception of an on-hook signal from the base station in step 15g. In this state, when the on-hook signal is received, the controller 200 performs on-hook processing and returns to a waiting state. In this on-hook processing, the switches 31 and 32 are switched from the external connection terminal 33 to the loudspeaker 11 and the microphone 12, respectively. FIG. 17 is a view showing the sequence of data communication control when the data communication key 17E is depressed in the digital mode as described above.

During speech in the analog mode, when a user depresses the privacy key 17F to perform privacy speech, the following privacy communication control is performed. That is, as shown in FIG. 16, in step 16a, the controller 200 determines whether a mode currently used in communication is a digital mode. Assuming that the digital mode is set in advance, the controller 200 determines that the operation can be directly shifted to the privacy speech, and the flow advances to step 16e. In step 16e, the display 18 is controlled to display a display pattern representing that the privacy speech is available. This display control is completed, the operation of the controller 200 is returned to a digital speech control operation.

In contrast to this, when a speech channel in an analog mode is set in the portable telephone unit as described above, the controller 200 determines that the mode must be changed to a digital mode required for privacy speech, and the controller 200 performs mode change processing in step 16b. In step 16b, as in the data communication control described above, processing of steps 6d to 6m in FIG. 6 is performed. That is, in step 6b, a mode change request message for requesting a change from an analog mode to a digital mode is generated and transmitted to the base station. In steps 6e to 6g, it is monitored whether a change request acknowledgement (ACK) response message is sent back from the base station in response to the mode change request message. When it is detected that this ACK response message is sent back, subsequently, it is monitored in steps 6j to 6m whether a handoff command signal is received from the base station. When the handoff command signal is received, the operation of the controller 200 is shifted to step 16c.

In step 16c, analog mode switching processing is performed in accordance with the sequence shown in FIG. 7. That is, in step 7a, it is determined whether a speech channel designated by the handoff command signal is a channel corresponding to a desired mode, i.e., a digital mode. As the determination result, when the designated mode is the desired digital mode, a corresponding speech channel is captured in step 7b in accordance with speech channel designation data included in the handoff command signal, and the transmission and reception timings of the digital speech channel are adjusted. Upon this adjustment, processing for switching an analog speech channel currently used in communication to the new digital speech channel in synchronization with the base station is performed. While the switching processing of the speech channels is performed, a switching control signal SW1 is output from the controller 200 to the analog switches 10 and 13, thereby switching the analog switches 10 and 13 from the analog audio circuit 15 to the speech-codec 9. This switching processing is completed, a display pattern "DIG" representing the switched digital mode is displayed on the display 18 in step 7c. When it is detected in step 7a that a speech channel of an analog mode different from the desired mode is designated by the base station, processing for automatically retransmitting a mode change request message is performed in steps 7d to 7j.

Upon completion of the mode switching processing as described above, after the controller 200 confirms in step 16d that the mode switching processing is completed, the flow advances to the step 16e. In step 16e, a display pattern representing that privacy speech is available is displayed on the display 18. For this reason, a user can know that the privacy speech is available, and important speech requiring the privacy speech can be performed subsequently. FIG. 18 shows the sequence of privacy communication control when the privacy key 17F is depressed in the analog mode as described above.

As described above, according to this embodiment, when a key such as the data communication key 17E or the privacy key 17F for performing specific functional communication is operated, control for changing a mode into a mode required to communication designated by the function key is performed. After the mode is changed into the desired mode by this control, control for switching a portable telephone unit into a state for performing the functional communication is performed. That is, the mode change control and the switching control for functional communication are sequentially and automatically performed. Therefore, a user can perform specific functional communication by only operating the function key without an operation for a mode change. That is, desired functional communication can be started by operating a specific function switch, i.e., by a minimum operation, thereby improving the operability for the functional communication. This effect is effective especially in a mobile telephone unit in which an operation for communication must be performed during a driving operation, since an influence on the driving operation can be minimized.

In this embodiment, when the specific function key such as the data communication key 17E or the privacy key 17F is operated, it is determined whether a mode currently used in communication coincides with a mode required for specific functional communication designated by the specific function key. Only when it is determined that the modes do not coincide with each other, mode change control to the mode required for the specific functional communication is performed. For this reason, only when a mode change is truly required, the mode change control is performed. Unnecessary control processing during communication is not performed in, e.g., a portable telephone unit or a base station. Therefore, a time loss in the control processing is prevented, and the control processing can be efficiently performed.

In addition, according to this embodiment, it is determined whether a mode is reliably changed to a desired mode after the mode change control is performed. Only when the desired mode is set, specific functional communication is performed. Therefore, when the base station has only one of an analog speech channel and a digital speech channel, or the base station has both of them but does not have any non-busy channel, specific functional communication in the inappropriate mode can be prevented. That is, the specific function communication is always performed in only a mode required therefor.

The present invention is not limited to the above embodiments. The following modifications can be effected.

According to the first embodiment, when a mode input by operating the mode designation key 17D coincides with a mode currently used in communication, the dual mode communication apparatus is controlled to be unconditionally returned to a speech control operation. However, when the quality of a speech channel currently used in communication is determined, and the level of the quality is lower than a predetermined level, a mode change control operation for changing the speech channel into another channel having the same mode as that of the channel currently used in communication may be performed. Under this control, when the speech channel currently used in communication is degraded, the channel can be changed to another speech channel of the same mode having a quality higher than the speech channel currently used in communication.

According to the first embodiment, when a handoff command to the same mode as the mode currently used in communication is received after a mode change request message is sent, handoff processing is performed in accordance with this command. However, when a handoff command of the same mode as the mode currently used in communication is received, the handoff processing is not necessarily performed. With this arrangement, a speech signal can be prevented from a hit caused by the handoff processing, thereby preventing the speech quality from degradation.

It is may be informed to a user that a handoff operation to a desired mode has not been performed or that the handoff operation has been performed. As informing methods, a display pattern of a mode displayed on the display 18 may be flickered, and a light-emitting diode (LED) may be turned on or flickered. In addition, an alarm is generated, or a voice message may be generated and output by a voice synthesizing circuit.

According to the first embodiment, when a mode input by operating the mode designation key 17D coincides with a mode currently used in communication, the communication apparatus is controlled to be directly returned to speech control. However, when the apparatus is returned to the speech control, it may be controlled to display that the designated mode has been set in advance. In this case, the following methods can be applied as display means. That is, an alarm or a voice message generated by a voice synthesizing means may be generated, or a display pattern of a mode displayed on the display 18 may be flickered for a predetermined period of time.

Automatic retransmission of a mode change request message may be performed not only when a handoff control operation is performed during communication but when a radio link is connected according to an outgoing or incoming call.

The console of the second embodiment has the mode designation key 17D, the data communication key 17E, and the privacy key 17F in addition to the send key 17A, the end key 17B, and the dial key 17C. However, the console may be arranged by arranging one function key and combining the function key and the dial key 17C so as to input a mode designation request, a data communication request, and a privacy communication request. With the above arrangement, the number of keys can be decreased, and the size of a portable telephone unit can be decreased.

In the system of the second embodiment, the external connection terminal 33 is arranged to a portable telephone unit, and a facsimile device 40 is connected to the terminal via the connection cord 41. However, the following arrangement may be used. That is, mating connector terminals are arranged in the portable telephone unit and the facsimile device and connected to each other, thereby connecting the portable telephone unit to the facsimile device.

The present invention can be applied to not only portable telephones but mobile telephones or cordless telephones.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radio communication apparatus used in a dual mode cellular radio system for selectively transmitting a communication signal in an analog or digital mode through a radio link established between a base station and said radio communication apparatus, comprising:

mode designation input means for selectively designating and inputting a desired mode from the analog mode and the digital mode;

mode comparison means for comparing the desired mode with the mode currently used in transmission of the communication signal when said mode designation input means designates and inputs the desired mode during the transmission of the communication signal; and change control means for transmitting to the base station a mode change request signal for changing the mode currently used in the transmission of the communication signal into the desired mode when said mode comparison means detects that the mode currently used in the transmission of the communication signal does not coincide with the desired mode, and for inhibiting the mode change request signal from being transmitted to the base station when said mode comparison means detects that the mode currently used in the transmission of the communication signal coincides with the desired mode.

2. The radio communication apparatus according to claim 1, wherein said change control means transmits to the base station at least the mode change request signal when said mode comparison means detects that the mode currently used in the transmission of the communication signal does not coincide with the desired mode, and inhibits at least the mode change request signal from being transmitted to the base station when said mode comparison means detects that the mode currently used in the transmission of the communication signal coincides with the desired mode.

3. The radio communication apparatus according to claim 1, wherein said mode comparison means and said change control means respectively execute mode comparison processing and control processing of mode change control prior to a start of main control associated with the mode change.

4. A dual mode cellular radio telephone apparatus used in a cellular radio system wherein speech signals are selectively communicated with a base station in either one of an analog transmission mode or a digital transmission mode over one or more radio channels and the speech signals are selectively subject to a digital signal processing for a secret communication, comprising:

establishing means for establishing a speech communication with the base station over a radio link on the basis of a transmission mode designated by the base station;

first user-actuatable switch means for selectively requesting the analog transmission mode and the digital transmission mode;

first transmitting means for transmitting a mode designation signal for requesting the analog transmission mode when the analog transmission mode is requested by said first user-actuatable switch means and for transmitting a mode designation signal requesting the digital transmission mode when the digital transmission mode is requested by said first user-actuatable switch means;

second user-actuatable switch means for requesting the secret communication;

second transmitting means responsive to an actuation of the second user-actuatable switch means for transmitting the mode designation signal requesting the digital transmission mode over the radio link;

determining means for determining whether the radio link is established between said dual mode cellular radio telephone apparatus and said base station in the digital transmission mode after the mode designation signal requesting the digital transmission mode is transmitted by said second transmitting means; and informing means for informing a speaker of capability of the secret communication when said determining means determines that the radio link is established in the digital transmission mode, and for informing the speaker of incapability of the secret communication when said determining means determines that the radio link is not established in the digital transmission mode.

5. A radio communication apparatus used in a dual mode cellular radio system for selectively transmitting a communication signal in an analog or digital mode through a radio link established between a base station and said radio communication apparatus, comprising:

a mode designation input apparatus for selectively designating and inputting a desired mode from the analog mode and the digital mode;

a mode comparison circuit for comparing the desired mode with the mode currently used in transmission of the communication signal when said mode designation input apparatus designates and inputs the desired mode during the transmission of the communication signal; and a change control circuit for transmitting to said base station a mode change request signal for changing the mode currently used in the transmission of the communication signal into the desired mode when said mode comparison circuit detects that the mode currently used in the transmission of the communication signal does not coincide with the desired mode, and for inhibiting the mode change request signal from being transmitted to said base station when said mode comparison circuit detects that the mode currently used in the transmission of the communication signal coincides with the desired mode.

6. The radio communication apparatus according to claim 5, wherein said change control circuit transmits to said base station at least the mode change request signal when said mode comparison circuit detects that the mode currently used in the transmission of the communication signal does not coincide with the desired mode, and inhibits at least the mode change request signal from being transmitted to said base station when said mode comparison circuit detects that the mode currently used in the transmission of the communication signal coincides with the desired mode.

7. The radio communication apparatus according to claim 5, wherein said mode comparison circuit and said change control circuit respectively execute mode comparison processing and control processing of mode change control prior to a start of main control associated with the mode change.

8. A dual mode cellular radio telephone apparatus used in a cellular radio system wherein speech signals are selectively communicated with a base station in either one of an analog transmission mode or a digital transmission mode over one or more radio channels and the speech signals are selectively subject to a digital signal processing for a secret communication, comprising:

communication circuitry for establishing a speech communication with said base station over a radio link on the basis of a transmission mode designated by said base station;

a first user-actuatable switch for selectively requesting the analog transmission mode and the digital transmission mode;

a first transmitter for transmitting a mode designation signal for requesting the analog transmission mode when the analog transmission mode is requested by said first user-actuatable switch and for transmitting a mode designation signal requesting the digital transmission mode when the digital transmission mode is requested by said first user-actuatable switch;

a second user-actuatable switch for requesting the secret communication;

a second transmitter responsive to an actuation of the second user-actuatable switch for transmitting the mode designation signal requesting the digital transmission mode over the radio link;

a controller for controlling said communication circuitry and for determining whether the radio link is established between said dual mode cellular radio telephone apparatus and said base station in the digital transmission mode after the mode designation signal requesting the digital transmission mode is transmitted by said second transmitter; and a display for informing a speaker that the secret communication is enabled when said controller determines that the radio link is established in the digital transmission mode, and for informing the speaker that the secret communication is not enabled when said controller determines that the radio link is not established in the digital transmission mode.

* * * * *